US011451992B2

(12) United States Patent
Pezeshki et al.

(10) Patent No.: US 11,451,992 B2
(45) Date of Patent: Sep. 20, 2022

(54) BEAM PREFERENCE FEEDBACK FOR DATA TRANSMISSIONS

(71) Applicant: QUALCOMM Incorporated, San Diego, CA (US)

(72) Inventors: Hamed Pezeshki, San Diego, CA (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 127 days.

(21) Appl. No.: 16/846,086

(22) Filed: Apr. 10, 2020

(65) Prior Publication Data
US 2020/0329395 A1    Oct. 15, 2020

Related U.S. Application Data

(60) Provisional application No. 62/833,587, filed on Apr. 12, 2019.

(51) Int. Cl.
*H04W 24/10* (2009.01)
*H04B 7/08* (2006.01)
(Continued)

(52) U.S. Cl.
CPC ............ *H04W 24/10* (2013.01); *H04B 7/088* (2013.01); *H04L 5/0051* (2013.01); *H04W 16/28* (2013.01); *H04W 72/042* (2013.01); *H04W 80/02* (2013.01)

(58) Field of Classification Search
CPC ...... H04B 7/088; H04L 5/0051; H04W 16/28; H04W 24/10; H04W 72/042; H04W 80/02
See application file for complete search history.

(56) References Cited

U.S. PATENT DOCUMENTS

| 11,051,282 B2* | 6/2021 | Chen ..................... H04W 72/04 |
| 2008/0171516 A1* | 7/2008 | Kakura ............... H04W 72/085 |
| | | 455/63.4 |

(Continued)

FOREIGN PATENT DOCUMENTS

| WO | WO-2016198123 A1 * | 12/2016 | ........ H04W 36/0079 |
| WO | WO-2017221202 A1 * | 12/2017 | .......... H04B 7/0417 |

(Continued)

OTHER PUBLICATIONS

International Search Report and Written Opinion—PCT/US2020/027857—ISAEPO—dated Jul. 6, 2020.

*Primary Examiner* — Eric Nowlin
(74) *Attorney, Agent, or Firm* — Holland & Hart LLP

(57) ABSTRACT

Methods, systems, and devices for wireless communications are described. The described techniques relate to improved methods, systems, devices, and apparatuses that support beam preference feedback for data transmissions. Generally, the described techniques provide for wireless communications at a user equipment (UE), that may perform a measurement of one or more reference signals from a base station. The UE may transmit to the base station an indication of a beam preference for communicating with the base station based on the measurement of the one or more reference signals. The UE may receive, based on the indication of the beam preference, downlink control information from the base station, the downlink control information including an indication of a beam for a data transmission. The UE may perform or receive the data transmission using the indicated beam.

24 Claims, 16 Drawing Sheets

(51) Int. Cl.
*H04L 5/00* (2006.01)
*H04W 16/28* (2009.01)
*H04W 72/04* (2009.01)
*H04W 80/02* (2009.01)

(56) References Cited

U.S. PATENT DOCUMENTS

| | | | | |
|---|---|---|---|---|
| 2013/0040682 A1* | 2/2013 | Chang | .................. | H04W 76/27 |
| | | | | 455/517 |
| 2016/0192329 A1* | 6/2016 | Park | .................... | H04B 7/088 |
| | | | | 370/329 |
| 2016/0323898 A1* | 11/2016 | Jo | .................... | H04W 72/048 |
| 2017/0006593 A1* | 1/2017 | Liu | .................... | H04W 16/32 |
| 2017/0142604 A1* | 5/2017 | Reial | ................... | H04W 72/042 |
| 2017/0188252 A1* | 6/2017 | Miao | ................... | H04L 5/0048 |
| 2017/0207845 A1* | 7/2017 | Moon | ................. | H04B 7/0695 |
| 2017/0303264 A1* | 10/2017 | Islam | .................. | H04B 7/0639 |
| 2017/0346539 A1* | 11/2017 | Islam | .................. | H04B 7/0417 |
| 2018/0332508 A1* | 11/2018 | Axelsson | ............ | H04L 5/0094 |
| 2018/0351624 A1* | 12/2018 | Hakola | .............. | H04B 7/0632 |
| 2018/0351627 A1* | 12/2018 | Nilsson | .............. | H04B 7/0695 |
| 2019/0045494 A1* | 2/2019 | Ho | .................... | H04W 72/042 |
| 2019/0082332 A1* | 3/2019 | Raghavan | ............ | H04B 7/0695 |
| 2019/0199412 A1 | 6/2019 | Koskela et al. | | |
| 2019/0268782 A1* | 8/2019 | Martin | .............. | H04W 36/0094 |
| 2019/0280835 A1* | 9/2019 | Maattanen | ........... | H04L 5/0051 |
| 2019/0327632 A1* | 10/2019 | Kim | .................... | H04B 7/0695 |
| 2020/0059290 A1* | 2/2020 | Pan | .................... | H04B 17/327 |
| 2020/0076492 A1* | 3/2020 | Wu | ........................ | H04B 7/063 |
| 2020/0100129 A1* | 3/2020 | Sun | .................... | H04W 72/046 |
| 2020/0154409 A1* | 5/2020 | Kang | ................... | H04W 72/04 |
| 2020/0169896 A1* | 5/2020 | Li | .......................... | H04W 48/16 |
| 2020/0244413 A1* | 7/2020 | Takeda | ................. | H04L 5/0048 |
| 2020/0329395 A1* | 10/2020 | Pezeshki | ............. | H04B 7/0695 |
| 2020/0413316 A1* | 12/2020 | Isaksson | .............. | H04W 24/10 |
| 2021/0083753 A1* | 3/2021 | Kim | .................... | H04B 7/0834 |
| 2021/0119688 A1* | 4/2021 | Enescu | ............... | H04B 7/0695 |
| 2021/0127424 A1* | 4/2021 | Yasukawa | ........... | H04W 16/28 |
| 2021/0184747 A1* | 6/2021 | Akkarakaran | ....... | H04B 7/0888 |
| 2021/0242928 A1* | 8/2021 | Park | .................... | H04B 17/318 |

FOREIGN PATENT DOCUMENTS

| | | | | | |
|---|---|---|---|---|---|
| WO | WO-2018017840 A1 | * | 1/2018 | .......... | H04W 72/046 |
| WO | WO-2018031875 A1 | * | 2/2018 | .......... | H04B 7/0617 |
| WO | WO-2020075978 A1 | * | 4/2020 | .............. | H04B 7/06 |
| WO | WO-2021070703 A1 | * | 4/2021 | .............. | H04B 7/06 |

\* cited by examiner

BEAM PREFERENCE FEEDBACK FOR DATA TRANSMISSIONS

CROSS REFERENCE

The present Application for Patent claims the benefit of U.S. Provisional Patent Application No. 62/833,587 by PEZESHKI et al., entitled "BEAM PREFERENCE FEEDBACK FOR DATA TRANSMISSIONS," filed Apr. 12, 2019, assigned to the assignee hereof, and expressly incorporated by reference herein.

BACKGROUND

The following relates generally to wireless communications, and more specifically to beam preference feedback for data transmissions.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some examples of a wireless communications system, a base station and a UE may communicate using highly directional transmissions (e.g., beams). A base station may configure the UE with multiple possible beams on which subsequent communications may occur, which may increase signaling overhead.

SUMMARY

The described techniques relate to improved methods, systems, devices, and apparatuses that support beam preference feedback for data transmissions. Generally, a user equipment (UE) may perform a measurement of one or more reference signals from a base station. The UE may identify one or more preferred or non-preferred beams, and may transmit to the base station an indication of a beam preference for communicating with the base station based on the measurement of the one or more reference signals. The UE may receive, based on the indication of the beam preference, downlink control information (DCI) from the base station, the DCI including an indication of a beam for a data transmission (e.g., a beam from a set of active beams). The UE may perform or receive the data transmission using the indicated beam.

In some aspects, the UE may perform a measurement of one or more candidate beams (e.g., candidate transmission configuration indication (TCI) states and/or candidate spatial relations). The UE may identify one or more preferred or non-preferred beams based on the measurement of the one or more candidate beams, and may transmit to the base station an indication of a beam preference for communicating with the base station based on the measurement of the one or more candidate beams. In some aspects, the base station may update a set of one or more active beams (e.g., set of one or more active TCI states) based on the beam preference received from the UE. For example, the base station may replace an active beam (e.g., active TCI state) of the set of active beams with a candidate beam (e.g., candidate TCI state) indicated by the beam preference.

In additional or alternative aspects, the UE may perform a measurement of one or more candidate beams. The UE may transmit to the base station an indication of one or more beam preferences for communicating with the base station based on the measurement of the one or more reference signals. The base station and/or the UE may be configured to associate one or more beam preferences with one or more mobility statuses of the UE. For example, the base station may be configured to associate the one or more beam preferences with one or more mobility statuses of the UE based on the measurement of the one or more reference signals, and may transmit an indication of the associations between the beam preferences and mobility statuses to the UE. Subsequently, the UE may be configured to determine a current mobility status of the UE, and transmit to the base station an indication of a beam preference associated with the current mobility status of the UE.

A method of wireless communications at a UE is described. The method may include performing a measurement of one or more reference signals from a base station, transmitting to the base station an indication of a beam preference for communicating with the base station based on the measurement of the one or more reference signals, receiving, based on the indication of the beam preference, DCI from the base station, the DCI including an indication of a beam for a data transmission, and performing or receiving the data transmission using the indicated beam.

An apparatus for wireless communications at a UE is described. The apparatus may include a processor, memory in electronic communication with the processor, and instructions stored in the memory. The instructions may be executable by the processor to cause the apparatus to perform a measurement of one or more reference signals from a base station, transmit to the base station an indication of a beam preference for communicating with the base station based on the measurement of the one or more reference signals, receive, based on the indication of the beam preference, DCI from the base station, the DCI including an indication of a beam for a data transmission, and perform or receiving the data transmission using the indicated beam.

Another apparatus for wireless communications at a UE is described. The apparatus may include means for performing a measurement of one or more reference signals from a base station, transmitting to the base station an indication of a beam preference for communicating with the base station based on the measurement of the one or more reference signals, receiving, based on the indication of the beam preference, DCI from the base station, the DCI including an indication of a beam for a data transmission, and performing or receiving the data transmission using the indicated beam.

A non-transitory computer-readable medium storing code for wireless communications at a UE is described. The code may include instructions executable by a processor to perform a measurement of one or more reference signals from a base station, transmit to the base station an indication of a beam preference for communicating with the base station based on the measurement of the one or more reference signals, receive, based on the indication of the beam preference, DCI from the base station, the DCI including an indication of a beam for a data transmission, and perform or receiving the data transmission using the indicated beam.

Some examples of the method, apparatuses, and non-transitory computer-readable medium described herein may further include operations, features, means, or instructions for receiving a first semi-static configuration message indicating a set of active beams, and identifying the beam preference based on the set of active beams, where transmitting the indication of the beam preference may be based on the identifying.

In some examples of the method, apparatuses, and non-transitory computer-readable medium described herein, the indication of the beam preference includes a subset of the set of active beams.

In some examples of the method, apparatuses, and non-transitory computer-readable medium described herein, the indication of the beam preference includes one or more candidate beams other than the set of active beams.

Some examples of the method, apparatuses, and non-transitory computer-readable medium described herein may further include operations, features, means, or instructions for receiving, based on the indication of the beam preference, a second semi-static configuration message indicating an updated set of active beams from the base station, where the indication of the beam for the data transmission may be based on the updated set of active beams.

In some examples of the method, apparatuses, and non-transitory computer-readable medium described herein, the indication of the beam preference includes an indication of a beam that may be spatially wider than at least one of the set of active beams.

Some examples of the method, apparatuses, and non-transitory computer-readable medium described herein may further include operations, features, means, or instructions for generating a scheduling request message or a medium access control (MAC) control element (MAC-CE) message, and where the indication of the beam preference may be included in the generated scheduling request message or the generated MAC-CE message.

Some examples of the method, apparatuses, and non-transitory computer-readable medium described herein may further include operations, features, means, or instructions for identifying, based on the measurements of the one or more reference signals, a set of one or more preferred beams, where the indication of the beam preference may be based on the one or more preferred beams.

Some examples of the method, apparatuses, and non-transitory computer-readable medium described herein may further include operations, features, means, or instructions for identifying, based on the measurements of the one or more reference signals, a set of one or more non-preferred beams, where the indication of the beam preference may be based on the one or more non-preferred beams.

Some examples of the method, apparatuses, and non-transitory computer-readable medium described herein may further include operations, features, means, or instructions for determining a mobility status of the UE, and determining the beam preference based on the mobility status.

A method of wireless communications at a base station is described. The method may include transmitting, to a UE, one or more reference signals from a base station, receiving, from the UE, an indication of a beam preference for communicating with the base station based on the one or more reference signals, transmitting, based on the indication of the beam preference, DCI to the UE, the DCI including an indication of a beam for a data transmission, and performing or receiving the data transmission using the indicated beam.

An apparatus for wireless communications at a base station is described. The apparatus may include a processor, memory in electronic communication with the processor, and instructions stored in the memory. The instructions may be executable by the processor to cause the apparatus to transmit, to a UE, one or more reference signals from a base station, receive, from the UE, an indication of a beam preference for communicating with the base station based on the one or more reference signals, transmit, based on the indication of the beam preference, DCI to the UE, the DCI including an indication of a beam for a data transmission, and perform or receiving the data transmission using the indicated beam.

Another apparatus for wireless communications at a base station is described. The apparatus may include means for transmitting, to a UE, one or more reference signals from a base station, receiving, from the UE, an indication of a beam preference for communicating with the base station based on the one or more reference signals, transmitting, based on the indication of the beam preference, DCI to the UE, the DCI including an indication of a beam for a data transmission, and performing or receiving the data transmission using the indicated beam.

A non-transitory computer-readable medium storing code for wireless communications at a base station is described. The code may include instructions executable by a processor to transmit, to a UE, one or more reference signals from a base station, receive, from the UE, an indication of a beam preference for communicating with the base station based on the one or more reference signals, transmit, based on the indication of the beam preference, DCI to the UE, the DCI including an indication of a beam for a data transmission, and perform or receiving the data transmission using the indicated beam.

Some examples of the method, apparatuses, and non-transitory computer-readable medium described herein may further include operations, features, means, or instructions for transmitting a first semi-static configuration message indicating a set of active beams, where the indication of the beam preference may be based on the set of active beams.

In some examples of the method, apparatuses, and non-transitory computer-readable medium described herein, the indication of the beam preference includes a subset of the set of active beams.

In some examples of the method, apparatuses, and non-transitory computer-readable medium described herein, the indication of the beam preference includes one or more candidate beams other than the set of active beams.

Some examples of the method, apparatuses, and non-transitory computer-readable medium described herein may further include operations, features, means, or instructions for transmitting, based on the indication of the beam preference, a second semi-static configuration message indicating an updated set of active beams from the base station, where the indication of the beam for the data transmission may be based on the updated set of active beams.

In some examples of the method, apparatuses, and non-transitory computer-readable medium described herein, the indication of the beam preference includes an indication of a beam that may be spatially wider than at least one of the set of active beams.

Some examples of the method, apparatuses, and non-transitory computer-readable medium described herein may further include operations, features, means, or instructions for receiving a scheduling request message or a MAC-CE message, where the indication of the beam preference may be included in the generated scheduling request message or the generated MAC-CE message.

In some examples of the method, apparatuses, and non-transitory computer-readable medium described herein, the indication of the beam preference includes one or more preferred beams.

In some examples of the method, apparatuses, and non-transitory computer-readable medium described herein, the indication of the beam preference includes one or more non-preferred beams.

In some examples of the method, apparatuses, and non-transitory computer-readable medium described herein, the beam preference may be based on a mobility status of the UE.

DETAILED DESCRIPTION

Figure 1:
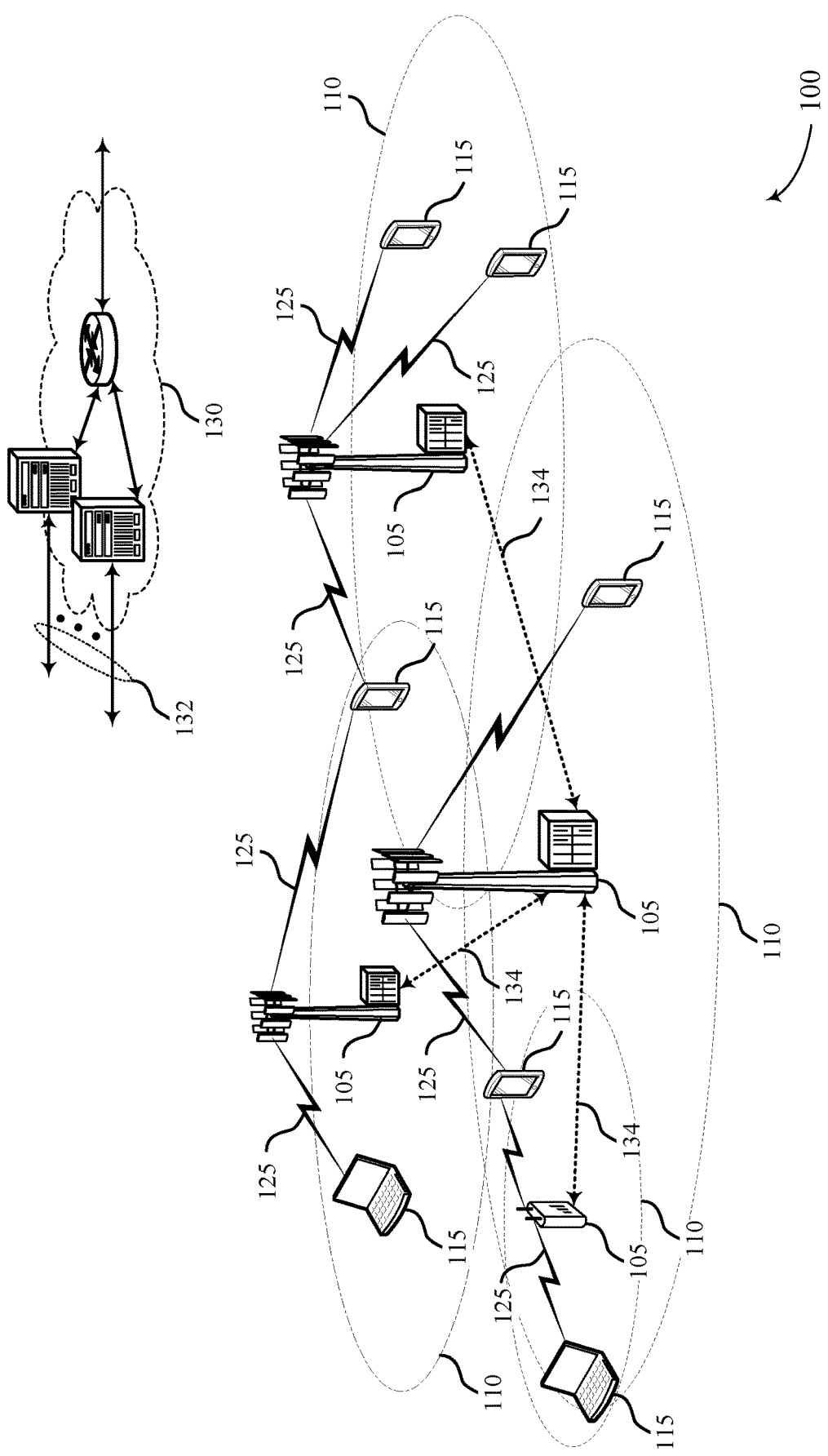
FIGS. 1 through 3 illustrate example wireless communications systems that support beam preference feedback for data transmissions in accordance with aspects of the present disclosure.

In some examples, a base station and a user equipment (UE) may communicate via highly directional transmissions (e.g., beams). The base station may transmit signals to the UE using beamforming techniques. In beamforming, a base station may direct a transmission via a narrow beam so that only one UE or a small set of UEs receive the transmission. Data transmission (e.g., physical downlink shared channel (PDSCH)) or a control transmission (e.g., a physical downlink control channel (PDCCH)), or the like may be transmitted by a base station using a transmission configuration indication (TCI) state (e.g., corresponding to a beamformed transmission) to a UE. The base station may provide, to the UE, a set of TCI states that are associated with each transmission beam. For uplink communications, the base station may provide the UE with a set of spatial relations (e.g., a beam direction, beam identifier, spatial stream, or the like). The UE may configure its antennas for receiving downlink transmissions from the base station or to send beamformed uplink transmissions to the base station based on the indicated TCI states or spatial relations, respectively.

In some cases, the base station may configure the UE with a set of active beams (e.g., up to eight active TCI states for receiving downlink transmissions, or up to eight active spatial relations for sending uplink transmissions). The set of active beams (e.g., active TCI states) may include a subset of a set of candidate beams (e.g., candidate TCI states). Each of the active TCI states or spatial relations may correspond to a beam. The base station may provide a grant (e.g., an uplink grant or a downlink grant) to the UE, including downlink control information (DCI). The DCI may include a three-bit indicator, which may indicate the TCI state or spatial relation for a scheduled PDSCH or PUSCH, respectively. The UE may generate a receive beam to receive the scheduled transmission or a transmit beam to send the scheduled transmissions. However, in some cases, a UE may be highly mobile (e.g., may travel at a time or speed which causes transmissions from a base station to not reach the UE). In some examples, a beam that is initially directed toward a UE at a first position may be sufficiently directed toward the UE at a second position, such that the UE is unable to provide feedback or response to the base station. For instance, a UE may be unable to adjust a downlink receive beam quickly enough to maintain a connection with the base station, and communications via an initially selected beam may be terminated in high mobility scenarios.

In some examples, to address the issues within high mobility scenarios or mobility statuses (e.g., current or future speed of the UE, current or future acceleration of the UE, current or future position of the UE), the UE may send an indication of beam preferences to the base station. The beam preferences may include desired or non-desired beams for the UE. In some examples, the beam preferences may include desired or non-desired beams associated with particular mobility statuses of the UE. For instance, the UE and/or the base station may associate different TCI states with different applicable mobility statuses such that varying mobility statuses of the UE correspond with varying beam preferences. For example, the base station may be configured to associate different TCI states with different applicable mobility statuses of the UE such that varying mobility statuses of the UE correspond with varying beam preferences. The base station may then share (e.g., transmit) an indication of the associations between different TCI states and mobility statuses of the UE. In this example, the UE may determine a current or future mobility status of the UE, and may send an indication of a beam preference corresponding to the determined mobility status. The beam preferences may include wide or narrow beams (e.g., wider beams than the set of initially configured active beams). The base station may select beams from the UE beam preferences, or the base station may ignore the UE beam preferences and select different beams to transmit. If the indication of beam preferences includes non-preferred beams, then the base station may remove the non-preferred beams from the set of active beams, or may ignore the beam preferences and continue to utilize non-preferred beams. In some cases, (e.g., if the base station adjusts the set of active beams based on the indication of beam preferences by adding new beams or removing old beams) the base station may send, to the UE, an updated set of active beams. In some examples, the indication of beam preferences may include wider beams that one or more of the beams included in the set of active beams. By using wider beams, the UE and the base station may successfully communicate even in high mobility scenarios.

Aspects of the disclosure are initially described in the context of wireless communications systems and process flows. Aspects of the disclosure are further illustrated by and described with reference to apparatus diagrams, system diagrams, and flowcharts that relate to beam preference feedback for data transmissions.

FIG. 1 illustrates an example of a wireless communications system 100 that supports beam preference feedback for data transmissions in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P)

or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200 \ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data.

A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions.

By way of another example, the receiving device (e.g., a UE 115) may try multiple receive beams during various mobility statuses of the UE 115 when receiving various signals from the base station. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

UE 115 may perform a measurement of one or more reference signals from a base station 105 and transmit to base station 105 an indication of a beam preference for communicating with base station 105 based on the measurement of the one or more reference signals. In some cases, the UE 115 may receive, based on the indication of the beam preference, DCI from base station 105, the DCI including an indication of a beam for a data transmission, and perform or receive the data transmission using the indicated beam. Such techniques may improve communication during high mobility scenarios and reduce latency in dynamic beam training procedures.

According to some aspects, a UE 115 may receive a first semi-static configuration message indicating a set of active beams selected from a set of candidate beams and identify the beam preference based on the set of active beams. In some cases, transmitting the indication of the beam preference is based on the identifying the beam preference. In some examples, UE 115 may generate a scheduling request message or a MAC control element (MAC-CE) message, in which the indication of the beam preference is included in the generated scheduling request message or the generated MAC-CE message. Techniques herein may improve communication during high mobility scenarios and reduce latency in dynamic beam training procedures.

Figure 2:
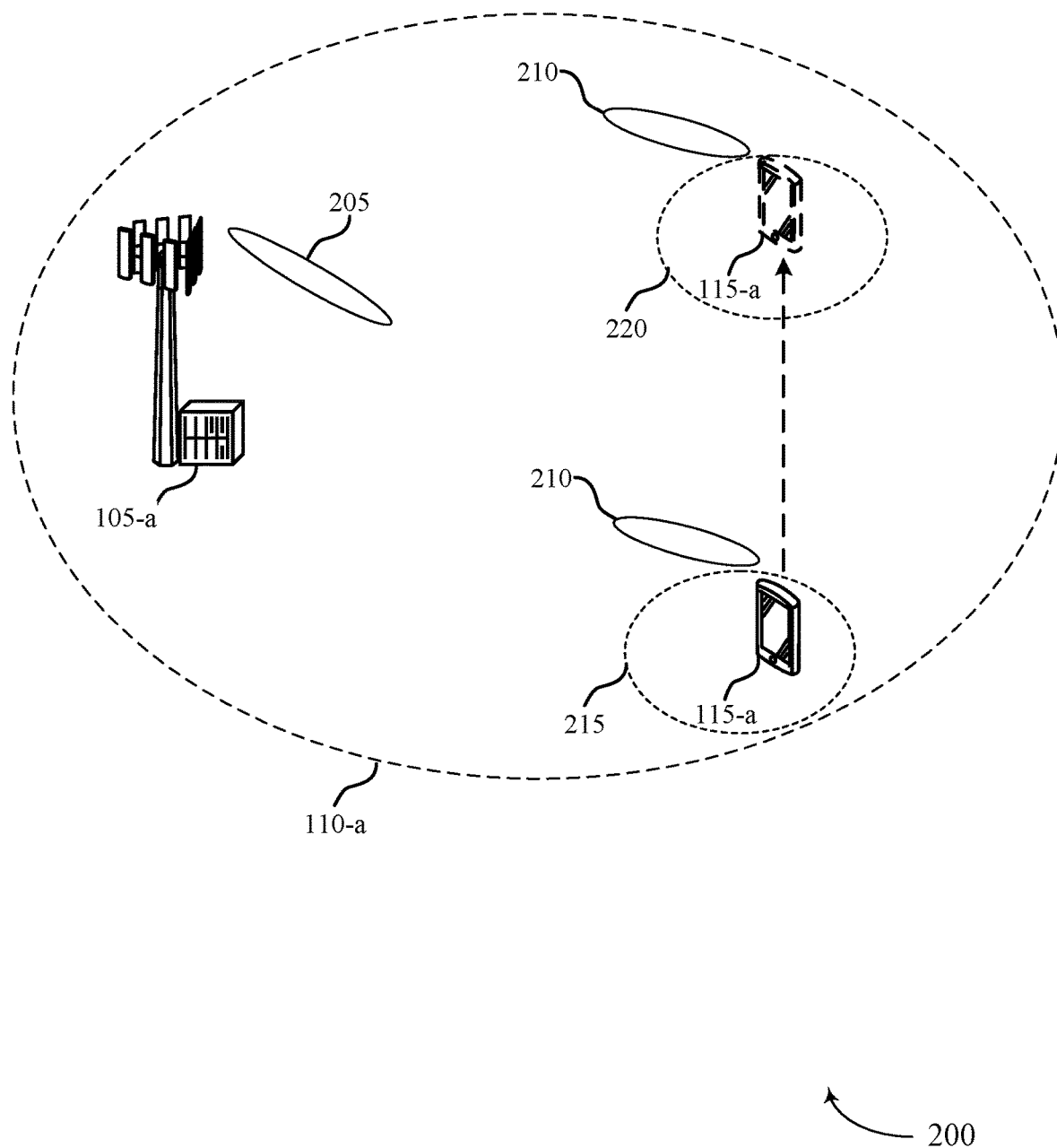

FIG. 2 illustrates an example of a wireless communications system 200 that supports beam preference feedback for data transmissions in accordance with aspects of the present disclosure. In some examples, wireless communications system 200 may implement aspects of wireless communications system 100. Wireless communications system 200 may include UE 115-a and base station 105-a, which may be examples of a UE 115 or a base station 105, respectively, as described herein with reference to FIG. 1.

In some examples, base station 105-a or UE 115-a, in geographic coverage area 110-a, may be equipped with multiple antennas, which may be used to employ techniques such as transmit diversity, receive diversity, MIMO communications, or beamforming.

In beamforming, base station 105-a may direct a transmission via a narrow beam so that only UE-115-a may receive the transmission. For downlink signaling, for example, base station 105-a may provide TCI states that are associated with each transmission beam. In some cases, the wireless communications system 200 may configure UE 115-a with a set of up to a threshold number of active TCI states (e.g., 4, 5, 8 active states). The active TCI states may be selected from a larger set of candidate TCI states, such that the set of active TCI states is a sub-set of the candidate TCI states. Base station 105-a may transmit a downlink grant for the downlink signal, including a DCI. The DCI may include a three-bit indicator which indicates the TCI state that is valid for the scheduled PDSCH.

In some examples, base station 105-a may select a beam for communicating with UE 115-a. Base station 105-a may configure different TCI states (e.g., a different configuration of antennas, ports, or antenna panels) to communicate with UE 115-a. Transmit beam 205 may be one of eight beams which are associated with the eight active TCI states. Base station 105-a may configure UE 115-a with the same set of different TCI states associated with specific beams. Receive beam 210 may be one of eight beams which are associated with the eight active TCI states. Thus, base station 105-a may select a TCI state from the set of TCI states, and may generate a transmit beam 205 according to the selected TCI state. Base station 105-a may indicate, via a DCI in a downlink grant, the selected TCI state, and UE 115-a may generate receive beam 210 based on the selected TCI state. Base station 105-a may send a transmission (e.g., on a PDSCH) via transmit beam 205 to UE 115-a, and UE 115-a may attempt to receive the transmission using receive beam 210. Similarly, for uplink transmissions, base station 105-a may generate and indicate a set of active spatial relations (e.g., beam direction, beam identifier, spatial layer information, spatial multiplexing information, spatial streams, spatial paths or the like). Base station 105-a may indicate, via a DCI, which of the set of spatial relations to use, and UE 115-a may generate a transmit beam based on the indicated spatial relation. Base station 105-a may generate a receive beam corresponding to the indicated spatial relation and may receive the uplink transmission based thereon.

In some examples, UE 115-a may be highly mobile (e.g., high mobility status). For example, UE 115-a may travel quickly from a first location to a second location while attempting to communicate with base station 105-a, which may result in failure to maintain communication on a selected beam. For example, base station 105-a may indicate a TCI state corresponding to a particular beam. Base station 105-a may generate transmit beam 205 based on the indicated TCI state. Similarly, UE 115-a may generate receive beam 210 based on the indicated TCI state. Base station 105-a may initiate transmission of a downlink signal using transmit beam 205. At a first location 215, receive beam 210 may be used to successfully receive transmissions from base station 105-a. However, in a high mobility scenarios, UE 115-a may move quickly from first location 215 to second location 220. At second location 220, receive beam 210 may no longer be usable for receiving downlink transmissions sent by base station 105-a using transmit beam 205, and the UE 115-a may be unable change beams quickly enough to address the high mobility of UE 115-a, which may result in termination of communications between base station 105-a and UE 115-a via the selected beam. That is, communications in high mobility scenarios may not be robust because beams may not be adjusted quickly enough, resulting in terminated transmission.

Figure 3:
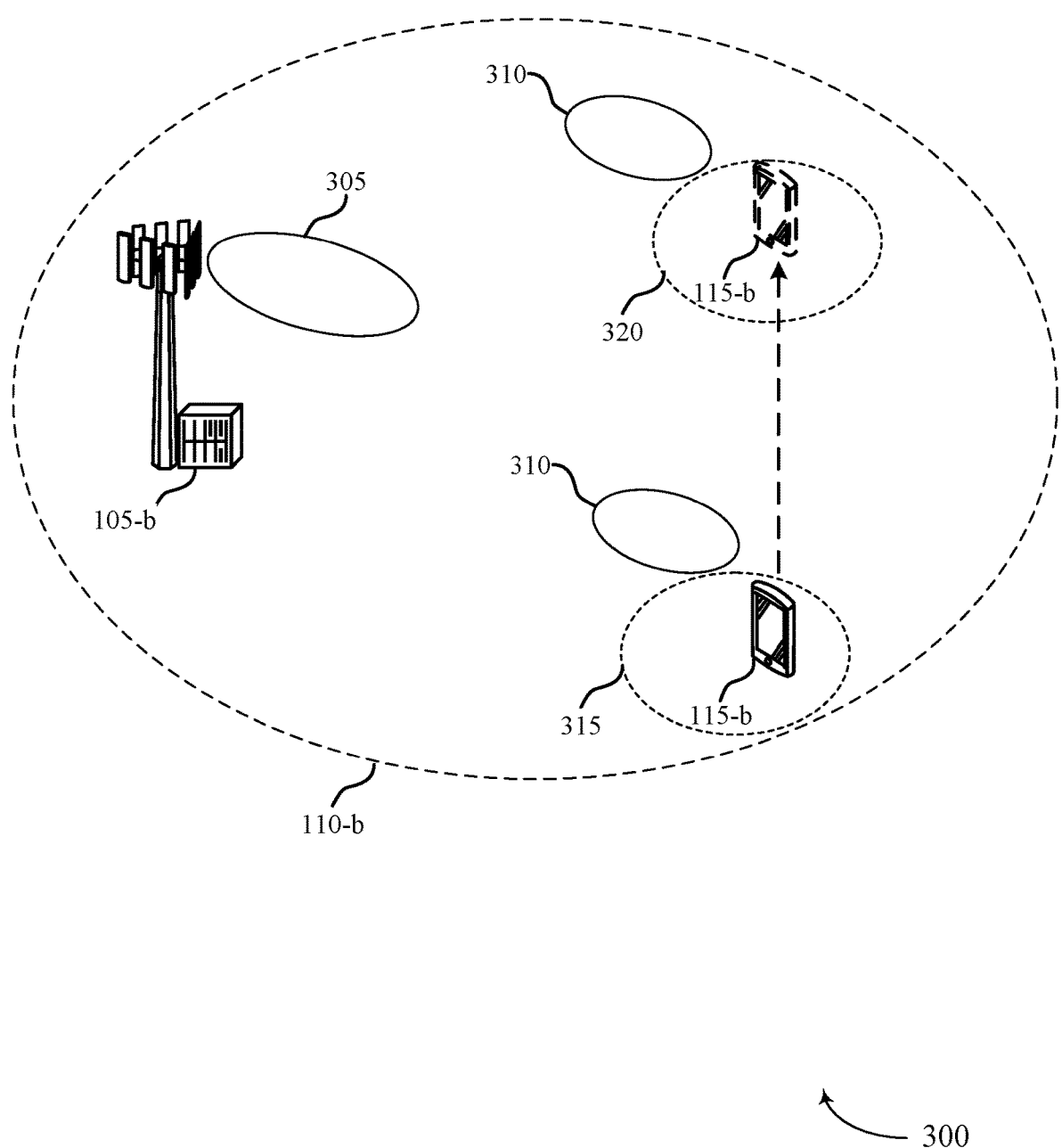

Instead, as described in greater detail with respect to FIG. 3, a UE 115-a may transmit a list of desired or non-desired beam indications so that base station 105-a may prioritize or exclude the indicated beams from the set of active beams or from configured beams (e.g., TCI states or spatial relations).

In such examples, UE 115-a may be able to use wider beams (e.g., wider downlink receive beams or wider uplink transmit beams) in high mobility scenarios for improved robustness. In this regard, the base station 105-a and/or the UE 115-a may be configured to associate given beams (e.g., given TCI states or given spatial relations) with given mobility statuses. For example, the base station 105-a and/or the UE 115-a may be configured to associate narrower beams with lower mobility statuses (e.g., lower speed scenarios), and may be further configured to associate wider beams with higher mobility statuses (e.g., higher speed scenarios). In this example, the UE 115-a may be configured to identify a preferred beam based on an association of a current or future mobility status of the UE 115-a with the desired beam. The UE 115-a may be configured to determine a current or future mobility status of the UE 115-a. For example, the UE 115-a may be configured to determine a current speed, acceleration, or position of the UE 115-a based on communications with the base station 105-a. By way of another example, the UE 115-a may be configured to determine a current speed, acceleration, or position of the UE 115-a via a mobility status manager, a global positioning system (GPS) component, a global navigation satellite system (GNSS) component, or the like. Additionally, use of preferred beams (e.g., wider beams) may lead to improved system efficiency (e.g., less beam training and beam changing procedures) and decreased system latency.

In some aspects, the UE 115-a may be configured to transmit indications of beam preferences of one or more candidate beams in order to replace one or more active beams with one or more candidate beams indicated in the beam preference. For example, the UE 115-a may perform a measurement of one or more candidate beams (e.g., candidate transmission configuration indication (TCI) states and/or candidate spatial relations). The UE may identify one or more preferred or non-preferred beams based on the measurement of the one or more candidate beams, and may transmit to the base station 105-a an indication of a beam preference for communicating with the base station 105-a based on the measurement of the one or more candidate beams. In some aspects, the base station 105-a may update the set of one or more active beams (e.g., set of one or more active TCI states) based on the beam preference received from the UE 115-a. For instance, the base station 105-a may replace an active beam (e.g., active TCI state) of the set of active beams with a candidate beam (e.g., candidate TCI state) indicated by the beam preference. In some aspects, the base station 105-a may be configured to replace the "weakest" active beam (as measured by the UE 115-a) with the candidate beam indicated by the beam preference.

In some aspects, the base station 105-a and/or the UE 115-a may be configured to determine a current mobility status exceeds a mobility status associated with an active beam (e.g., TCI states or spatial relations). For example, as described herein, the base station 105-a may be configured to associate beams (e.g., TCI states or spatial relations) with mobility statuses of the UE 115-a. The base station 105-a may then transmit to the UE 115-a an indication of the associations between the beams and mobility statuses of the UE 115-a. In this example, the UE 115-a may exhibit a first mobility status (e.g., first speed), and may communicate with the base station 105-a via a first beam (e.g., first TCI state or first spatial relation) associated with the first mobility status. Subsequently, the UE 115-a may determine that the UE 115-a exhibits a second mobility status (e.g., second speed) which exceeds the applicable mobility scenario of the first beam (e.g., second speed is greater than the first speed).

For instance, the UE 115-a may determine that the first beam is not configured for communications at the second speed of the second mobility status. In this example, the UE 115-a may determine a second beam associated with the second mobility status, and may transmit an indication of beam preference for communications with the base station 105-a, the indication of beam preference associated with the second mobility status.

FIG. 3 illustrates an example of a wireless communications system 300 that supports beam preference feedback for data transmissions in accordance with aspects of the present disclosure. In some examples, wireless communications system 300 may implement aspects of wireless communications system 100. Wireless communications system 300 may include UE 115-b and base station 105-b, which may be examples of a UE 115 or a base station 105, respectively, as described herein with reference to FIG. 1.

In some examples, base station 105-b and UE 115-b, in coverage area 110-b, may use beam preference feedback to improve communications during high mobility scenarios. Base station 105-b may send one or more reference signals (e.g., channel state information reference signals (CSI-RSs) or synchronization signal blocks (SSBs), or the like), and UE 115-b may perform measurements on the one or more reference signals. Based on the measurements, UE 115-b may identify one or more preferred beams. In some aspects, the UE 115-b may perform measurements on the one or more reference signals during varying mobility statuses of the UE 115-b. For example, the UE 115-b may perform measurements on the one or more reference signals during a first mobility status when the UE 115-b is traveling at a speed of approximately 10-15 miles per hour (mph), and may perform measurements on the one or more reference during a second mobility status when the UE 115-b is traveling at a speed greater than 50 mph. In some aspects, the base station 105-a and/or the UE 115-b may be configured to associate one or more beam preferences with one or more mobility statuses of the UE 115-b based on the measurement of the one or more reference signals. UE 115-b may send an indication of beam preferences to base station 105-b. The beam indication preferences may include desired or non-desired beams. The beam preferences may include spatially wide beams or spatially narrow beams. In some examples, UE 115-b may select the beam preferences according to TCI configurations or spatial relation sets. For instance, preferred beams may be included in a configured set of active beams (e.g., TCI states or spatial relations), or may be candidate beams other than the configured set of active beams. By way of another example, the UE 115-b may select the beam preferences according to associations between given mobility statuses and beams. For instance, the UE 115-b may determine a current or future mobility status of the UE 115-b, and determine a beam preference for communications with the base station 105-b based on the determined mobility status. UE 115-b may send the beam indication preferences in a scheduling request message or a medium access control (MAC) control element (MAC-CE) message.

In some examples, base station 105-b may prioritize or exclude the preferred beams indicated in the beam preferences from a set of active beams (e.g., up to eight active TCI states or spatial relations). Base station 105-b may include the beam indication preferences in the set of active beams, and use them for subsequent communications, or may include them in the set of active beams and not use them. In some examples, the beam preferences may include non-preferred beams. In such examples, base station 105-b may keep the non-preferred beams not recommended by UE 115-*b* in the set of active beams, but may not use the non-preferred beams. In some examples, base station 105-*b* may remove the non-preferred beams not recommended by UE 115-*b* from the set of active beams.

In some examples, base station 105-*b* may update the set of active beams, and may indicate the updated set of active beams to UE 115-*b*. In such examples, UE 115-*b* may update its set of active beams for communication with base station 105-*b*. In some aspects, the base station 105-*b* may update the set of active beams by replacing one or more active beams of the set of active beams with one or more candidate beams. In this regard, the one or more candidate beams thereby become active beams, and the one or more active beams removed from the set of active beams become candidate beams. In such examples, the base station 105-*b* may indicate the updated set of active beams to the UE 115-*b*, and the UE 115-*b* may update its set of active beams for communication with the base station 105-*b*. UE 115-*b* may receive DCI from base station 105-*b* including an indication of which beams base station 105-*b* has selected for transmission. In some examples, base station 105-*b* may perform or receive data transmission based on the beam indication preference received from UE 115-*b*.

In some examples, base station 105-*b* may improve system optimization by using preferred beams, as indicated by UE 115-*b*. For instance, UE 115-*b* may be highly mobile, moving rapidly from first position 315 to second position 320. UE 115-*b* may determine its highly mobile state, and may identify (based on reference signal measurements) one or more preferred beams. For instance, UE 115-*b* may perform measurements which determine that a wider receive beam 310 (e.g., wider than receive beam 210 as described with respect to FIG. 2) may be beneficial in a highly mobile scenario. The UE 115-*b* may then transmit a beam preference to the base station 105-*b*. In this example, the base station 105-*b* may be configured to associate given beams (e.g., given TCI states or given spatial relations) with given mobility status of the UE 115-*b*. For example, the base station 105-*b* may be configured to associate narrower beams with lower mobility statuses (e.g., mobility statuses associated with lower speeds or lower accelerations), and may be further configured to associate wider beams with higher mobility statuses (e.g., mobility statuses associated with higher speeds or higher accelerations). The base station 105-*b* may report the associations between mobility statuses and corresponding beam preferences, and the UE 115-*b* may be configured to store a list of associations or mappings between mobility statuses and corresponding preferred beams (or non-preferred beams). In this example, the UE 115-*b* may be configured to identify a preferred beam based on an association of a current or future mobility status of the UE 115-*b*. UE 115-*b* may send an indication of beam preferences to base station 105-*b*. For instance, the indication of beam preferences may include an indication of a TCI state corresponding to receive beam 310 and transmit beam 305 (or a spatial relation corresponding to a transmit beam at UE 115-*b* and a receive beam at base station 105-*b*). If the TCI state corresponding to receive beam 310 is included in the set of active beams, then base station 105-*b* may select that TCI state. Otherwise, base station 105-*b* may update the set of active TCI states, and configure UE 115-*b* with an updated set of active TCI states. Base station 105-*b* may send a grant (e.g., a downlink grant) including a DCI, and the DCI may indicate a TCI state corresponding to receive beam 310. In such examples, UE 115-*b* may generate receive beam 310. Base station 105-*b* may generate transmit beam 305. Base station 105-*b* may send a downlink transmission according to the downlink grant using transmit beam 305, and UE 115-*b* may receive the downlink transmissions using receive beam 310. In some examples, preferred receive beam 310 may be wide enough that UE 115-*b* can successfully receive the downlink transmission at first position 315 and at second position 320 (e.g., without having to change receive beams due to high mobility). Similarly, UE 115-*b* may indicate preferred beams for uplink transmissions, and base station 105-*b* and UE 115-*b* may generate transmit and receive beams based on indicated spatial relations.

Figure 4:
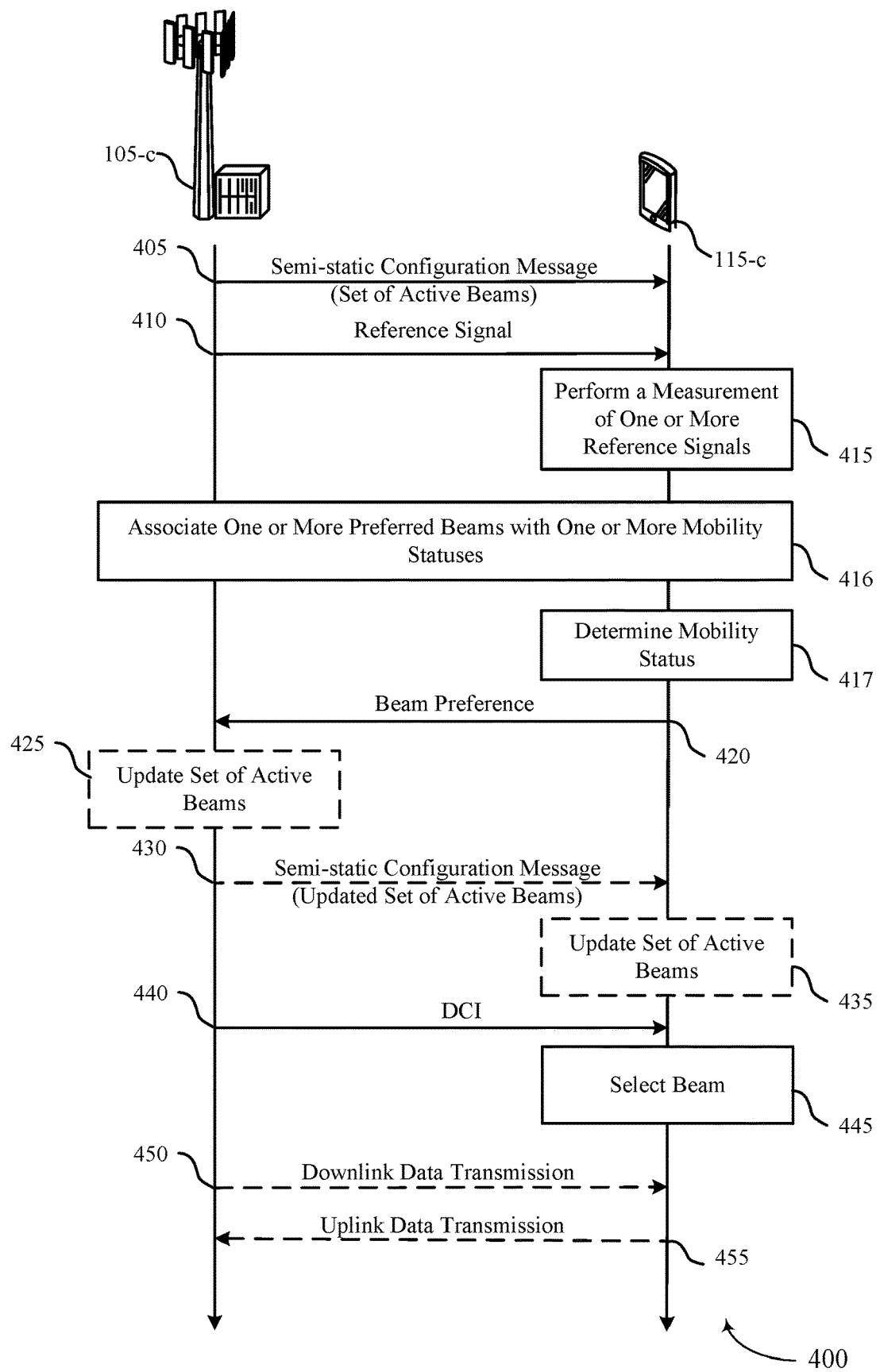
FIG. 4 illustrates an example of a process flow that supports beam preference feedback for data transmissions in accordance with aspects of the present disclosure.

FIG. 4 illustrates an example of a process flow 400 that supports beam preference feedback for data transmissions in accordance with aspects of the present disclosure. In some examples, process flow 400 may implement aspects of wireless communications system 100, wireless communications system 200, or wireless communications system 300.

At 405, base station 105-*c* may transmit a semi-static configuration message to UE 115-*c*. The configuration message may be an RRC message, a MAC-CE, or the like. In some examples, the semi-static configuration message may include a set of active beams selected from a set of candidate beams. For instance, the set of active beams may include a configuration indication of TCI states for the UE 115-*c* to use for receiving downlink signals. In some examples, the set of active beams may include a set of spatial preferences for transmitting uplink signals. In some examples, the set of active beams may include eight active beams.

At 410, base station 105-*c* may transmit one or more reference signals to UE 115-*c*. The one or more reference signals may include CSI-RSs, SSBs, or the like. At 415, UE 115-*c* may perform a measurement of the one or more reference signals. UE 115-*c* may determine one or more preferred beams (e.g., uplink transmit beams or downlink receive beams) based on the measurements.

At 416, the UE 115-*c* and/or the base station 105-*c* may associate one or more preferred beams (e.g., preferred TCI states or preferred spatial relations) with one or more mobility statuses of the UE 115-*c*. For example, the base station 105-*c* may be configured to associate one or more preferred beams with one or more mobility statuses of the UE 115-*c*, and transmit to the UE 115-*c* an indication of the associations between the preferred beams and the mobility statuses of the UE 115-*c*. In additional or alternative aspects, the UE 115-*c* may be configured to associate the one or more preferred beams with the one or more mobility statuses based on the measurement of the one or more reference signals. In a step 417, the UE 115-*c* may determine a mobility status of the UE 115-*c*.

At 420, UE 115-*c* may transmit an indication of a beam preference to base station 105-*c*, based on the measurement of the one or more reference signals. In some aspects, the beam preference may be based, at least in part, on the determined mobility status of the UE 115-*c* and the associations formed between beam preferences and mobility statuses. For example, upon determining a mobility status of the UE 115-*c*, the UE 115-*c* may determine a beam preference associated with the determined mobility status. UE 115-*c* may send the beam indication preferences in a scheduling request message or a MAC-CE message. The indication of beam preference may include one or more preferred beams or non-preferred beams, determined based at least in part by performing measurements on the received reference signals. The preferred beams may or may not overlap with the active beams included in the semi-static configuration message received at 405. For instance, the preferred beams may be a subset of the set of active beams. In such examples, UE 115-c may identify one or more of the active beams in the set of active beams, and may indicate that the one or more of the set of active beams is a preferred beam. In some instances, UE 115-c may identify one or more of the active beams in the set of active beams, and indicate that the set of one or more active beams of the set of active beams is a non-preferred beam. In some examples, UE 115-c may identify one or more candidate beams that are not included in the set of active beams, and may indicate to base station 105-c that the unincluded beams are preferred or non-preferred beams. For instance, the preferred beams may include one or more candidate beams which are not included in the set of active beams, and the UE 115-c may indicate to the base station that the one or more candidate beams are preferred beams, and are to replace one or more active beams in the set of active beams.

In this regard, the beam preference indication may, in some examples, include both beams from the set of active beams and candidate beams not included in the set of active beams. In some examples, the indication of a beam preference may include one or more broad or coarse beams. For instance, if the set of active beams includes one or more narrow beams, then the one or more narrow beams may not be usable in cases where UE 115-c is highly mobile, as described in greater detail with respect to FIG. 3. Thus, UE 115-c may indicate wider beams that can be used in highly mobile states. In some examples, UE 115-c may determine its own mobility status (e.g., whether it is moving, whether it is projected to be moving within a threshold amount of time, how fast it is moving, or the like), and may send the indication of the beam preference based on the determined mobility status. For example, the UE 115-c may determine its own mobility status, and may identify a corresponding beam preference corresponding to the identified mobility status.

At 425, base station 105-c may update the set of active beams for communication with UE 115-c based on the indication of a beam preference from UE 115-c at 420. For example, base station 105-c may include UE-recommended beams in the set of active beams (e.g., the set of active TCI states or spatial relations), and may use the UE-recommended beams or may not use the UE-recommended beams for communications at 450 or 455. Base station 105-c may keep beams that are not recommended by UE 115-c in the set of active beams and use them or not use them, or may remove beams not recommended by UE 115-c from the set of active beams.

In cases where the beam preference transmitted at 420 indicates one or more candidate beams not included in the set of active beams, the base station 105-c may be configured to update the set of active beams by replacing one or more active beams with the one or more candidate beams indicated by the beam preference. In this example, the one or more candidate beams indicated in the beam preference thereby become active beams, and the one or more active beams removed from the list of active beams thereby become candidate beams. For instance, in some aspects, the base station 105-c may be configured to replace the "weakest" active beam (as measured by the UE 115-a) with the candidate beam indicated by the beam preference.

At 430, if base station 105-c updated its set of active beams at 425, then base station 105-c may transmit a second semi-static configuration message to UE 115-c. The second semi-static configuration message may be an RRC message, a MAC-CE, or the like. In some examples, the semi-static configuration message may include an updated set of active beams. For instance, the updated set of active beams may include a configuration indication of updated TCI states for the UE 115-c to use for receiving downlink signals. In some examples, the set of active beams may include an updated set of spatial preferences for transmitting uplink signals. In some examples, the set of active beams may include eight active beams.

At 435, if base station 105-c sends an updated set of active beams at 430, then UE 115-c may update the set of active beams for communication with base station 105-c.

At 440, base station 105-c may transmit a grant (e.g., uplink grant for uplink transmissions over a PUSCH, or a downlink grant for downlink transmissions over a PDSCH). The grant may include a DCI. The DCI may also include an indication of a beam (e.g., a 3-bit indicator corresponding to one of the eight active beams). If base station 105-c updated the set of active beams at 430, then the indication of the beam may correspond to the updated set of active beams. For example, if UE 115-c identifies a new beam, not included in the original set of active beams, and indicates the preferred new beam at 420, then base station 105-c may update the set of active beams to include the new beam at 425, send an updated set of active beams including the new beam to UE 115-c at 430, and may indicate via the DCI at 440 that UE 115-c is to select the new beam for subsequent communications. Alternatively, if base station 105-c did not update the set of active beams at 425, then the indication of the beam may indicate one of the beams included in the original set of active beams configured at 405. For example, if UE 115-c identifies a first beam in the set of active beams and indicates that the first beam (e.g., and other beams) is a preferred beam at 420, then base station 105-c may not update its set of active beams but may optimize subsequent transmissions by selecting the first beam for subsequent communications. In such examples, base station 105-c may indicate the first beam for subsequent communications via the indication in the DCI at 440, and the indication may correspond to the original set of active beams.

At 445, UE 115-c may select a beam to communicate with base station 105-c based on the updated set of active beams. The selected beam may be a preferred beam indicated at 420, or a non-preferred beam indicated at 420, one of the original set of active beams configured at 405 or an updated set of active beams updated at 435 (e.g., if the set of active beams was updated).

At 450, if the grant sent at 440 was a downlink grant, base station 105-c may send a downlink data transmission to UE 115-c over a PDCCH according to the grant. In such examples, base station 105-c may configure its antennas to generate a transmit beam according to a TCI state from the set of TCI states (e.g., set of active beams). UE 115-c may configure its antennas to generate a receive beam according to the TCI state indicated via the DCI at 440.

At 455, if the grant set at 440 was an uplink grant, UE 115-c may send an uplink data transmission to base station 105-c. UE 115-c may configure its antennas to generate a transmit beam according to a spatial relation from the set of spatial relations (e.g., set of active beams) indicated via DCI 440. Base station 105-c may configure its antennas to generate a receive beam according to the spatial relation.

Figure 5:
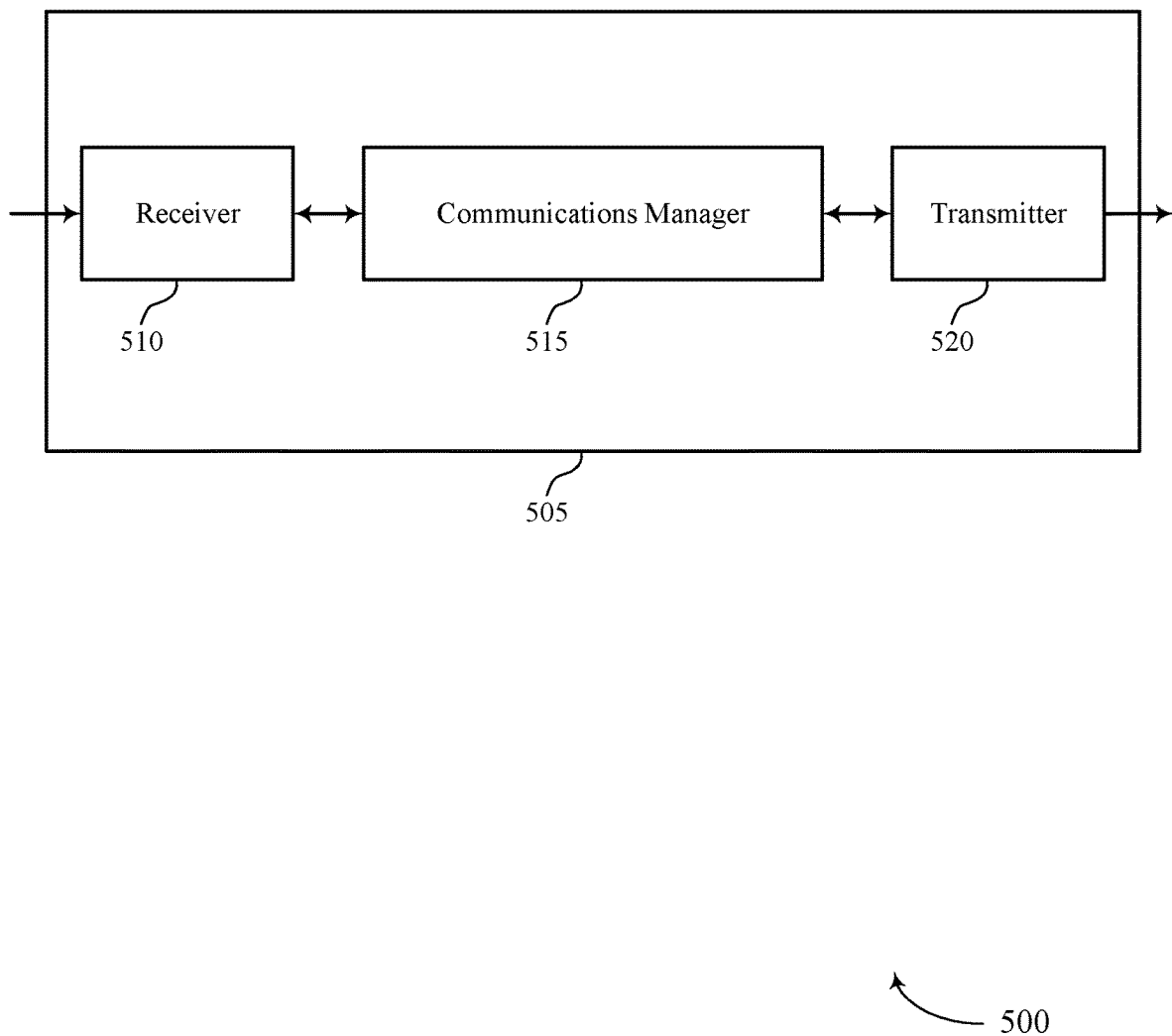
FIGS. 5 and 6 show block diagrams of devices that support beam preference feedback for data transmissions in accordance with aspects of the present disclosure.

FIG. 5 shows a block diagram 500 of a device 505 that supports beam preference feedback for data transmissions in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to beam preference feedback for data transmissions). Information may be passed on to other components of the device 505. The receiver 510 may be an example of aspects of the transceiver 820 described with reference to FIG. 8. The receiver 510 may utilize a single antenna or a set of antennas.

The communications manager 515 may perform a measurement of one or more reference signals from a base station, transmit to the base station an indication of a beam preference for communicating with the base station based on the measurement of the one or more reference signals, receive, based on the indication of the beam preference, DCI from the base station, the DCI including an indication of a beam for a data transmission, and perform or receive the data transmission using the indicated beam. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

In some examples, the communications manager 515 may be implemented as an integrated circuit or chipset for a mobile device modem, and the receiver 510 and transmitter 520 may be implemented as analog components (e.g., amplifiers, filters, antennas) coupled with the mobile device modem to enable wireless transmission and reception over one or more bands.

The communications manager 515 as described herein may be implemented to realize one or more potential advantages. One implementation may allow the device 505 to provide a beam preference to a base station for communications between the device 505 and the base station. Based on the techniques for indicating the beam preference, a base station may determine a beam for the device 505 to use for communications in high mobility scenarios, for example. Such techniques may increase the likelihood of successful communications between the device 505 and a base station, reduce communication or connection failures, and improve network efficiency. In some examples, based on a greater likelihood of successful communications, the device 505 may more efficiently power a processor or one or more processing units associated transmitting and receiving communications, which may enable the device to save power and increase battery life.

Figure 6:
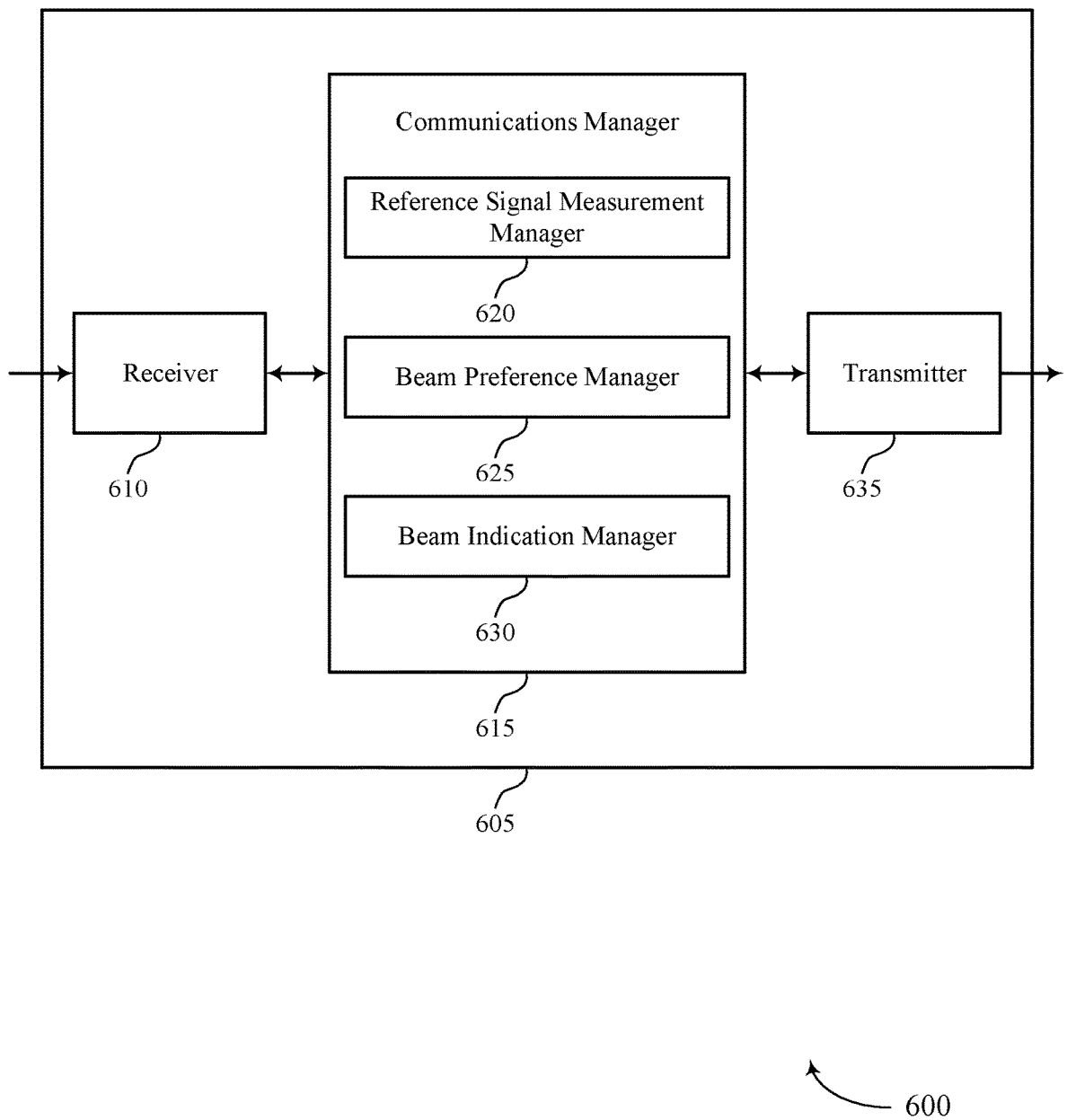

FIG. 6 shows a block diagram 600 of a device 605 that supports beam preference feedback for data transmissions in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to beam preference feedback for data transmissions). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a reference signal measurement manager 620, a beam preference manager 625, and a beam indication manager 630. The communications manager 615 may be an example of aspects of the communications manager 810 described herein.

The reference signal measurement manager 620 may perform a measurement of one or more reference signals from a base station.

The beam preference manager 625 may transmit to the base station an indication of a beam preference for communicating with the base station based on the measurement of the one or more reference signals.

The beam indication manager 630 may receive, based on the indication of the beam preference, DCI from the base station, the DCI including an indication of a beam for a data transmission and perform or receive the data transmission using the indicated beam.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
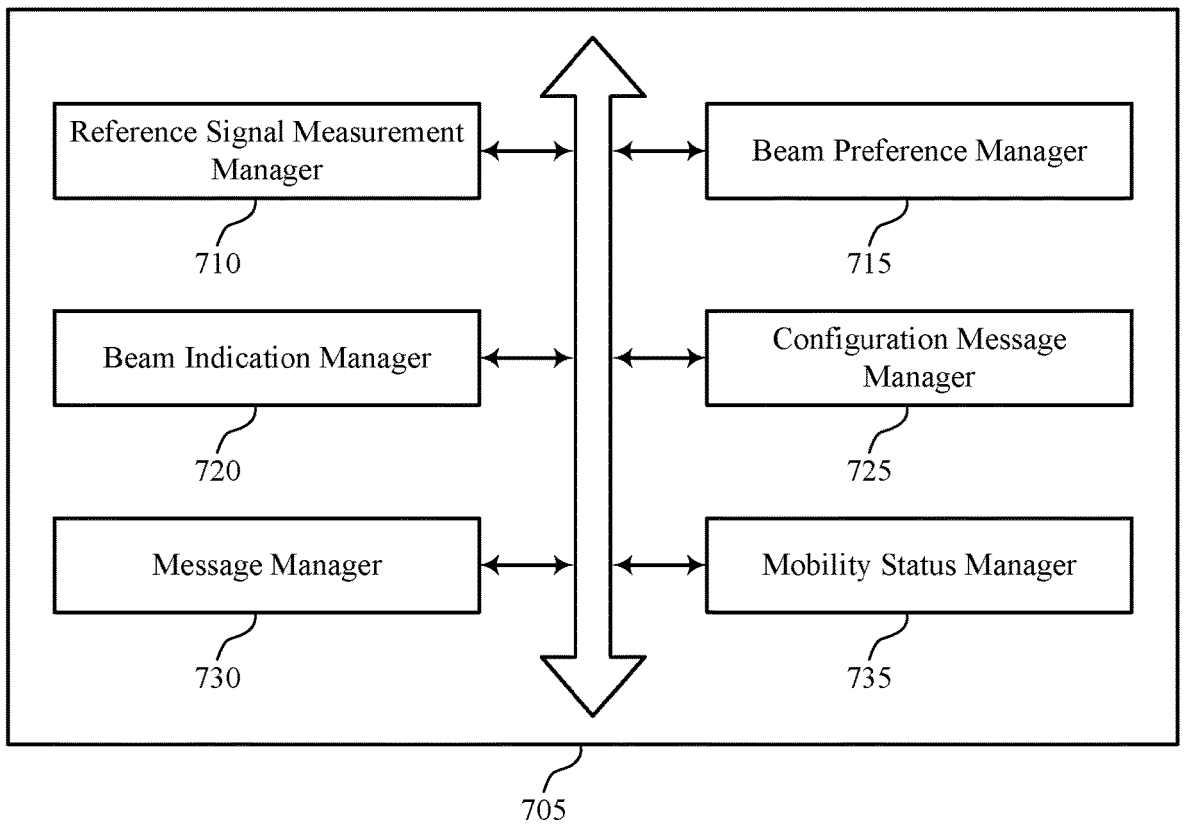
FIG. 7 shows a block diagram of a communications manager that supports beam preference feedback for data transmissions in accordance with aspects of the present disclosure.

FIG. 7 shows a block diagram 700 of a communications manager 705 that supports beam preference feedback for data transmissions in accordance with aspects of the present disclosure. The communications manager 705 may be an example of aspects of a communications manager 515, a communications manager 615, or a communications manager 810 described herein. The communications manager 705 may include a reference signal measurement manager 710, a beam preference manager 715, a beam indication manager 720, a configuration message manager 725, a message manager 730, and a mobility status manager 735. Each of these modules may communicate, directly or indirectly, with one another (e.g., via one or more buses).

The reference signal measurement manager 710 may perform a measurement of one or more reference signals from a base station.

The beam preference manager 715 may transmit to the base station an indication of a beam preference for communicating with the base station based on the measurement of the one or more reference signals. In some examples, the beam preference manager 715 may identify the beam preference based on the set of active beams, where transmitting the indication of the beam preference is based on the identifying.

In some examples, the beam preference manager 715 may identify, based on the measurements of the one or more reference signals, a set of one or more preferred beams, where the indication of the beam preference is based on the one or more preferred beams. In some examples, the beam preference manager 715 may identify, based on the measurements of the one or more reference signals, a set of one or more non-preferred beams, where the indication of the beam preference is based on the one or more non-preferred beams. In some cases, the indication of the beam preference includes a subset of the set of active beams. In some cases, the indication of the beam preference includes one or more candidate beams not included within the set of active beams. In some cases, the indication of the beam preference includes an indication of a candidate beam that is spatially wider than at least one of the set of active beams.

The beam indication manager 720 may receive, based on the indication of the beam preference, DCI from the base station, the DCI including an indication of a beam for a data transmission. In some examples, the beam indication manager 720 may perform or receive the data transmission using the indicated beam.

The configuration message manager 725 may receive a first semi-static configuration message indicating a set of active beams. In some examples, the configuration message manager 725 may receive, based on the indication of the beam preference, a second semi-static configuration message indicating an updated set of active beams from the base station, where the indication of the beam for the data transmission is based on the updated set of active beams.

The message manager 730 may generate a scheduling request message or a MAC-CE message. In some examples, the message manager 730 may where the indication of the beam preference is included in the generated scheduling request message or the generated MAC-CE message.

The mobility status manager 735 may determine a current or future mobility status of the UE. In some examples, the mobility status manager 735 may determine the beam preference based on the mobility status.

Figure 8:
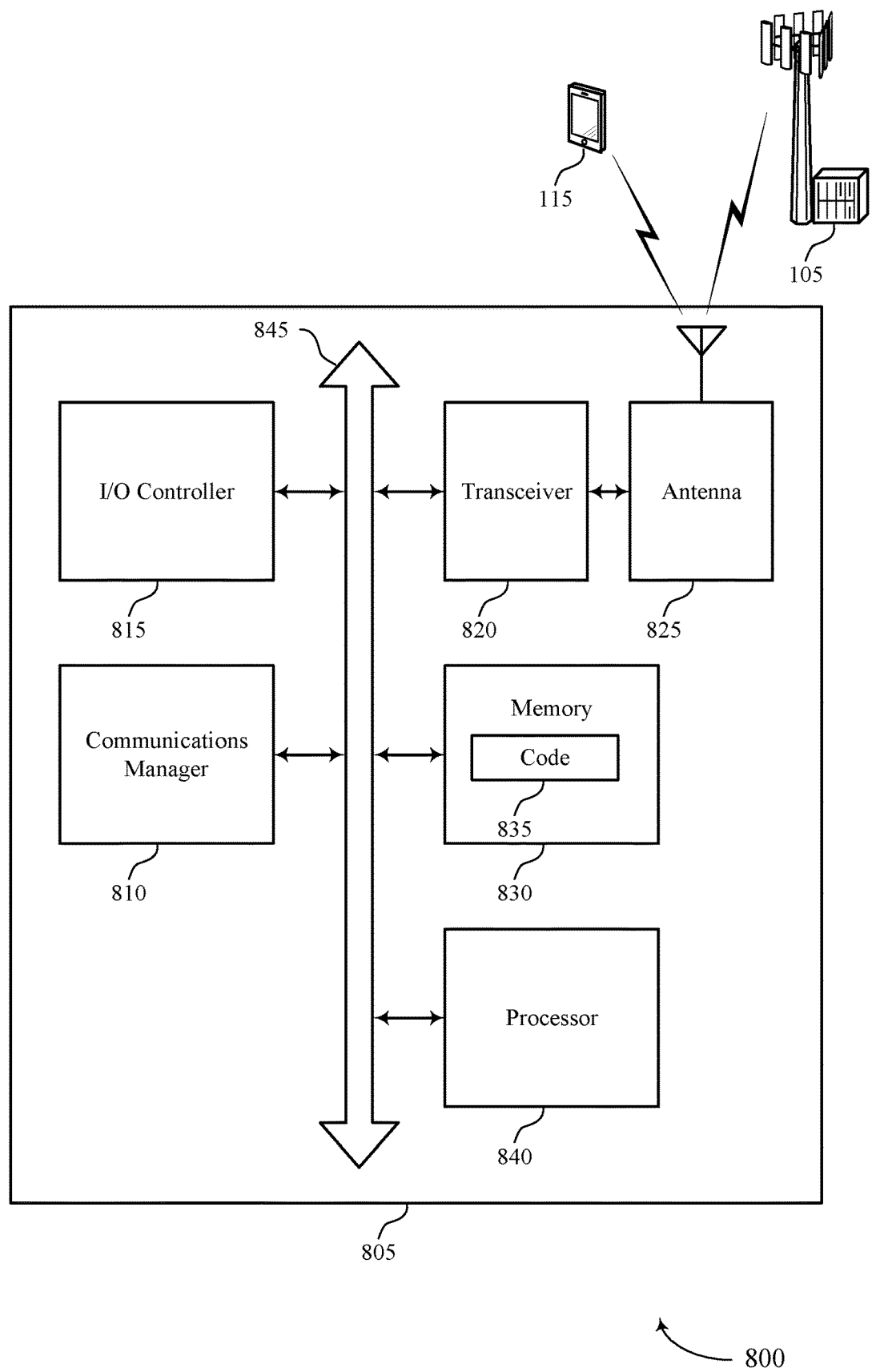
FIG. 8 shows a diagram of a system including a device that supports beam preference feedback for data transmissions in accordance with aspects of the present disclosure.

FIG. 8 shows a diagram of a system 800 including a device 805 that supports beam preference feedback for data transmissions in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may perform a measurement of one or more reference signals from a base station, transmit to the base station an indication of a beam preference for communicating with the base station based on the measurement of the one or more reference signals, receive, based on the indication of the beam preference, DCI from the base station, the DCI including an indication of a beam for a data transmission, and perform or receive the data transmission using the indicated beam.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random access memory (RAM) and read only memory (ROM). The memory 830 may store computer-readable, computer-executable code 835 including instructions that, when executed, cause the processor 840 to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting beam preference feedback for data transmissions).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
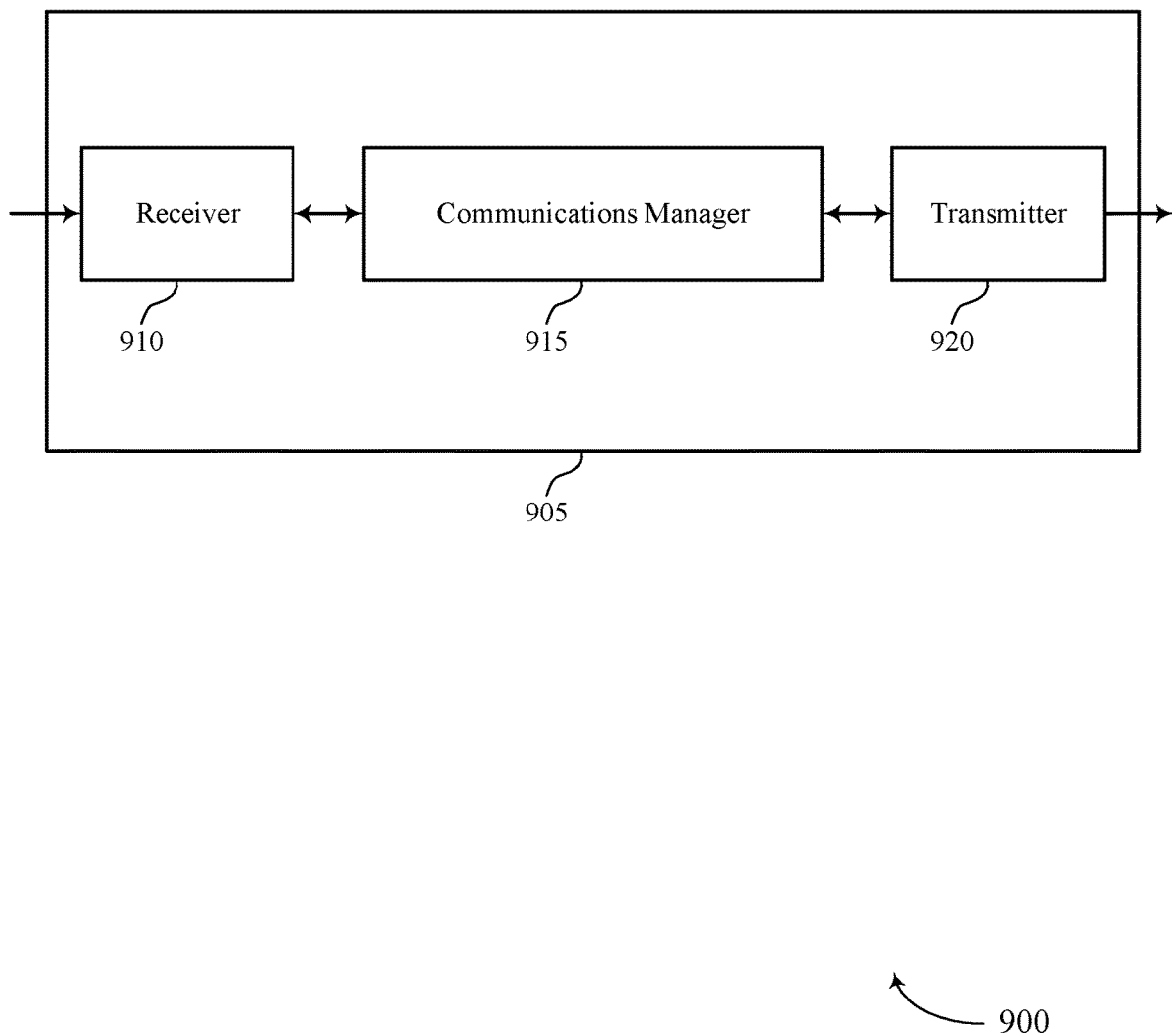
FIGS. 9 and 10 show block diagrams of devices that support beam preference feedback for data transmissions in accordance with aspects of the present disclosure.

FIG. 9 shows a block diagram 900 of a device 905 that supports beam preference feedback for data transmissions in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to beam preference feedback for data transmissions). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit, to a UE, one or more reference signals from a base station, receive, from the UE, an indication of a beam preference for communicating with the base station based on the one or more reference signals, transmit, based on the indication of the beam preference, DCI to the UE, the DCI including an indication of a beam for a data transmission, and perform or receive the data transmission using the indicated beam. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
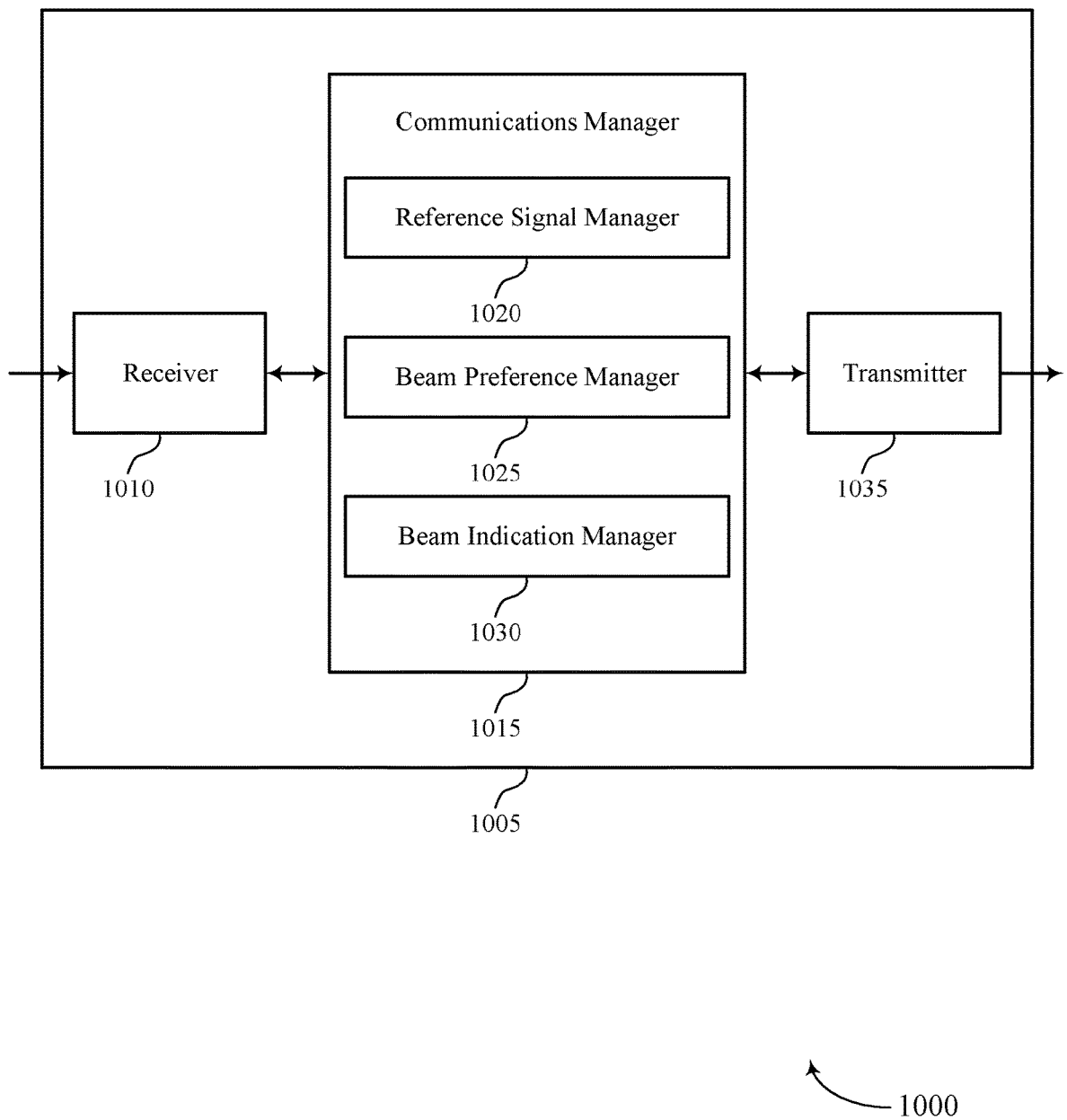

FIG. 10 shows a block diagram 1000 of a device 1005 that supports beam preference feedback for data transmissions in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to beam preference feedback for data transmissions, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a reference signal manager 1020, a beam preference manager 1025, and a beam indication manager 1030. The communications manager 1015 may be an example of aspects of the communications manager 1210 described herein.

The reference signal manager 1020 may transmit, to a UE, one or more reference signals from a base station.

The beam preference manager 1025 may receive, from the UE, an indication of a beam preference for communicating with the base station based on the one or more reference signals.

The beam indication manager 1030 may transmit, based on the indication of the beam preference, DCI to the UE, the DCI including an indication of a beam for a data transmission and perform or receive the data transmission using the indicated beam.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
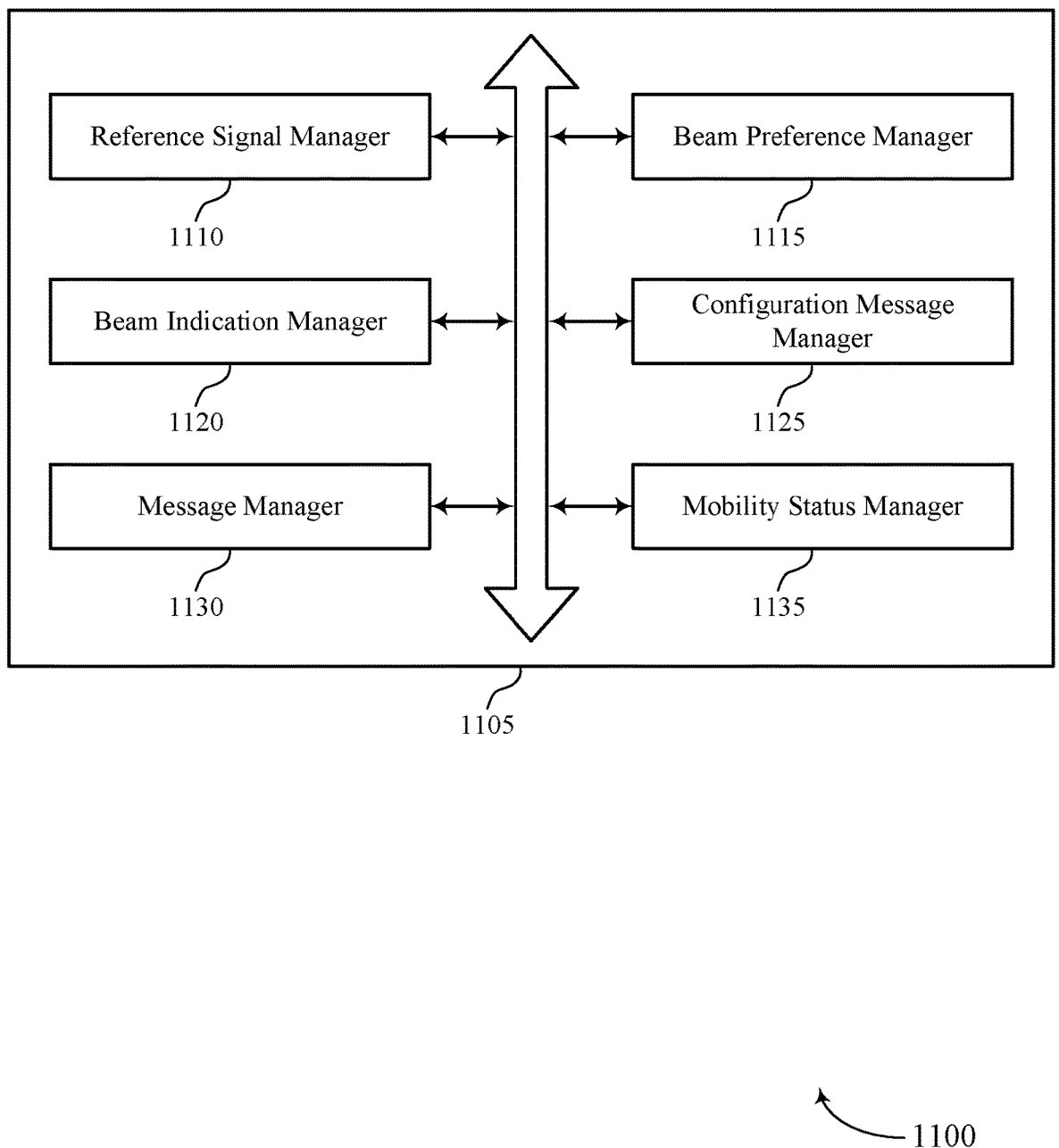
FIG. 11 shows a block diagram of a communications manager that supports beam preference feedback for data transmissions in accordance with aspects of the present disclosure.

FIG. 11 shows a block diagram 1100 of a communications manager 1105 that supports beam preference feedback for data transmissions in accordance with aspects of the present disclosure. The communications manager 1105 may be an example of aspects of a communications manager 915, a communications manager 1015, or a communications manager 1210 described herein. The communications manager 1105 may include a reference signal manager 1110, a beam preference manager 1115, a beam indication manager 1120, a configuration message manager 1125, a message manager 1130, and a mobility status manager 1135. Each of these modules may communicate, directly or indirectly, with one another (e.g., via one or more buses).

The reference signal manager 1110 may transmit, to a UE, one or more reference signals from a base station.

The beam preference manager 1115 may receive, from the UE, an indication of a beam preference for communicating with the base station based on the one or more reference signals. In some cases, the indication of the beam preference includes a subset of the set of active beams. In some cases, the indication of the beam preference includes one or more candidate beams not included within the set of active beams. In some cases, the indication of the beam preference includes one or more preferred beams. In some cases, the indication of the beam preference includes one or more non-preferred beams.

The beam indication manager 1120 may transmit, based on the indication of the beam preference, DCI to the UE, the DCI including an indication of a beam for a data transmission. In some examples, the beam indication manager 1120 may perform or receive the data transmission using the indicated beam. In some cases, the indication of the beam preference includes an indication of a candidate beam that is spatially wider than at least one of the set of active beams.

The configuration message manager 1125 may transmit a first semi-static configuration message indicating a set of active beams, where the indication of the beam preference is based on the set of active beams. In some examples, the configuration message manager 1125 may transmit, based on the indication of the beam preference, a second semi-static configuration message indicating an updated set of active beams from the base station, where the indication of the beam for the data transmission is based on the updated set of active beams.

The message manager 1130 may receive a scheduling request message or a MAC-CE message, where the indication of the beam preference is included in the generated scheduling request message or the generated MAC-CE message.

The mobility status manager 1135 may determine that the beam preference is based on a mobility status of the UE. In some aspects, the mobility status manager 1135 may be configured to determine a current or future mobility status of the UE.

Figure 12:
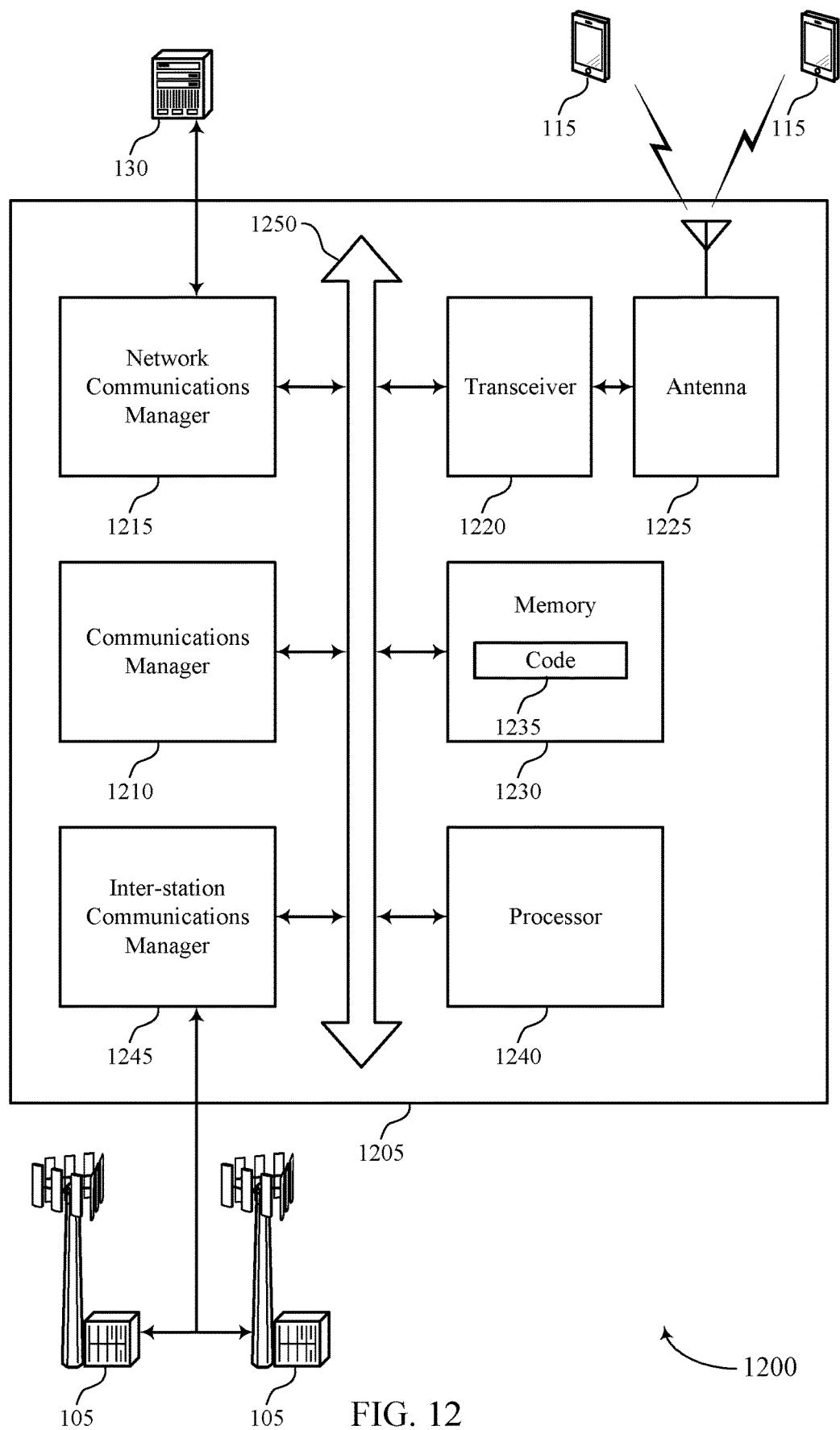
FIG. 12 shows a diagram of a system including a device that supports beam preference feedback for data transmissions in accordance with aspects of the present disclosure.

FIG. 12 shows a diagram of a system 1200 including a device 1205 that supports beam preference feedback for data transmissions in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit, to a UE, one or more reference signals from a base station, receive, from the UE, an indication of a beam preference for communicating with the base station based on the one or more reference signals, transmit, based on the indication of the beam preference, DCI to the UE, the DCI including an indication of a beam for a data transmission, and perform or receive the data transmission using the indicated beam.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting beam preference feedback for data transmissions).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
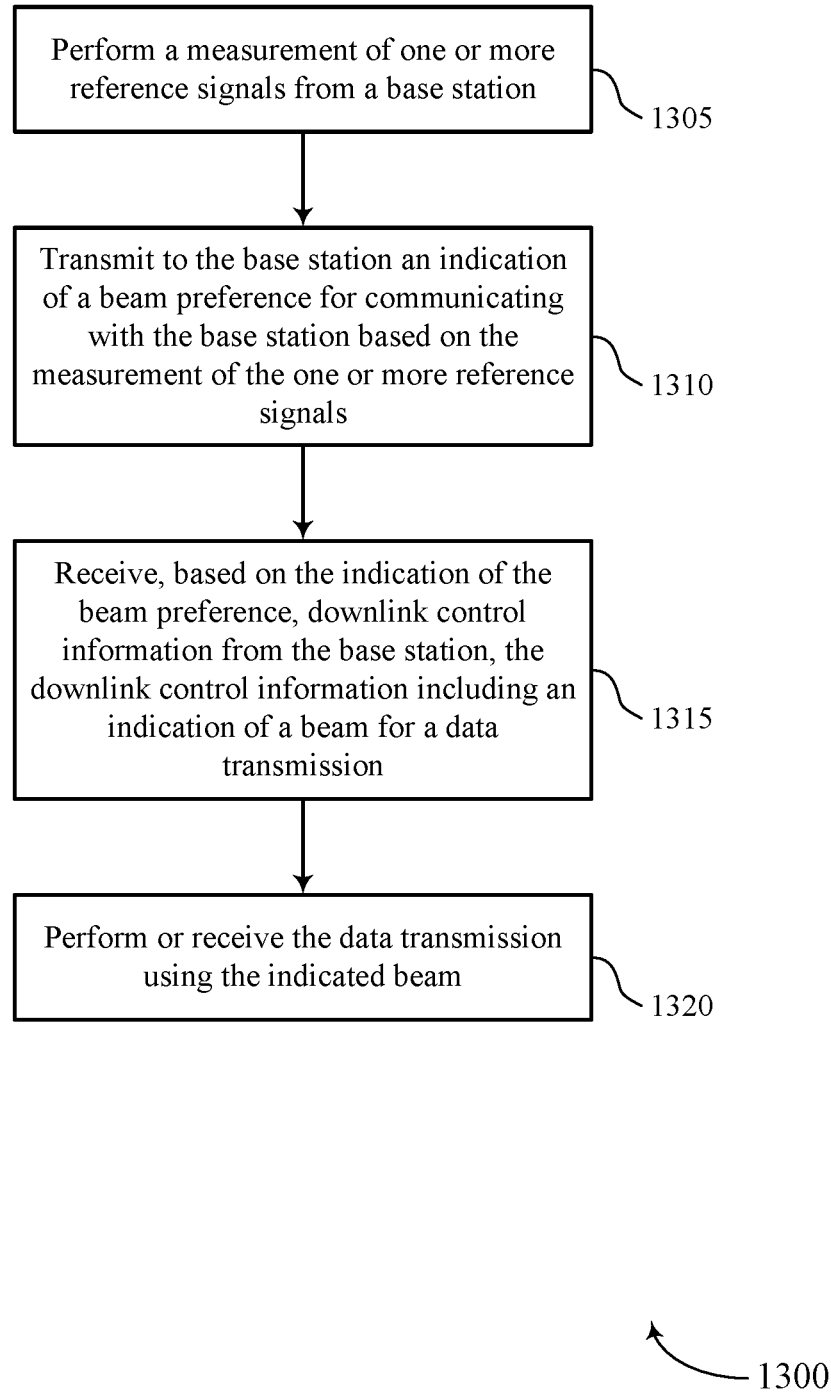
FIGS. 13 through 16 show flowcharts illustrating methods that support beam preference feedback for data transmissions in accordance with aspects of the present disclosure.

FIG. 13 shows a flowchart illustrating a method 1300 that supports beam preference feedback for data transmissions in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described herein. Additionally, or alternatively, a UE may perform aspects of the functions described herein using special-purpose hardware.

At 1305, the UE may perform a measurement of one or more reference signals from a base station. The operations of 1305 may be performed according to the methods described herein. In some examples, aspects of the operations of 1305 may be performed by a reference signal measurement manager as described with reference to FIGS. 5 through 8.

At 1310, the UE may transmit to the base station an indication of a beam preference for communicating with the base station based on the measurement of the one or more reference signals. The operations of 1310 may be performed according to the methods described herein. In some examples, aspects of the operations of 1310 may be performed by a beam preference manager as described with reference to FIGS. 5 through 8.

At 1315, the UE may receive, based on the indication of the beam preference, DCI from the base station, the DCI including an indication of a beam for a data transmission. The operations of 1315 may be performed according to the methods described herein. In some examples, aspects of the operations of 1315 may be performed by a beam indication manager as described with reference to FIGS. 5 through 8.

At 1320, the UE may perform or receive the data transmission using the indicated beam. The operations of 1320 may be performed according to the methods described herein. In some examples, aspects of the operations of 1320 may be performed by a beam indication manager as described with reference to FIGS. 5 through 8.

Figure 14:
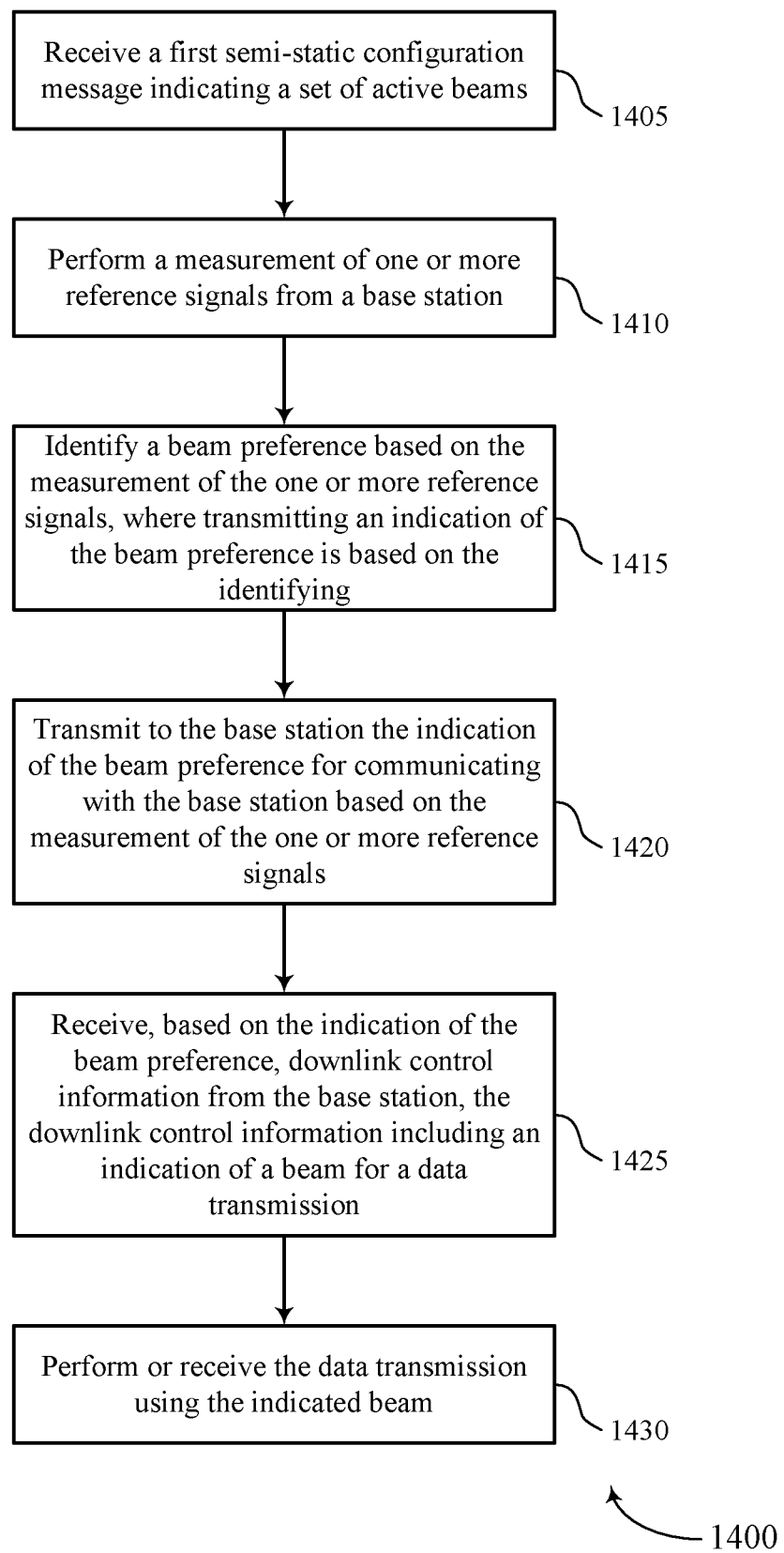

FIG. 14 shows a flowchart illustrating a method 1400 that supports beam preference feedback for data transmissions in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described herein. Additionally, or alternatively, a UE may perform aspects of the functions described herein using special-purpose hardware.

At 1405, the UE may receive a first semi-static configuration message indicating a set of active beams. The operations of 1405 may be performed according to the methods described herein. In some examples, aspects of the operations of 1405 may be performed by a configuration message manager as described with reference to FIGS. 5 through 8.

At 1410, the UE may perform a measurement of one or more reference signals from a base station. The operations of 1410 may be performed according to the methods described herein. In some examples, aspects of the operations of 1410 may be performed by a reference signal measurement manager as described with reference to FIGS. 5 through 8.

At 1415, the UE may identify a beam preference based on the measurement of the one or more reference signals, where transmitting an indication of the beam preference is based on the identifying. For example, the UE may identify a beam preference for one or more active beams within the set of active beams, or may identify a beam preference for one or more candidate beams not included in the set of active beams. The operations of 1415 may be performed according to the methods described herein. In some examples, aspects of the operations of 1415 may be performed by a beam preference manager as described with reference to FIGS. 5 through 8.

At 1420, the UE may transmit to the base station the indication of a beam preference for communicating with the base station based on the measurement of the one or more reference signals. The operations of 1420 may be performed according to the methods described herein. In some examples, aspects of the operations of 1420 may be performed by a beam preference manager as described with reference to FIGS. 5 through 8.

At 1425, the UE may receive, based on the indication of the beam preference, DCI from the base station, the DCI including an indication of a beam for a data transmission. The operations of 1425 may be performed according to the methods described herein. In some examples, aspects of the operations of 1425 may be performed by a beam indication manager as described with reference to FIGS. 5 through 8.

At 1430, the UE may perform or receive the data transmission using the indicated beam. The operations of 1430 may be performed according to the methods described herein. In some examples, aspects of the operations of 1430 may be performed by a beam indication manager as described with reference to FIGS. 5 through 8.

Figure 15:
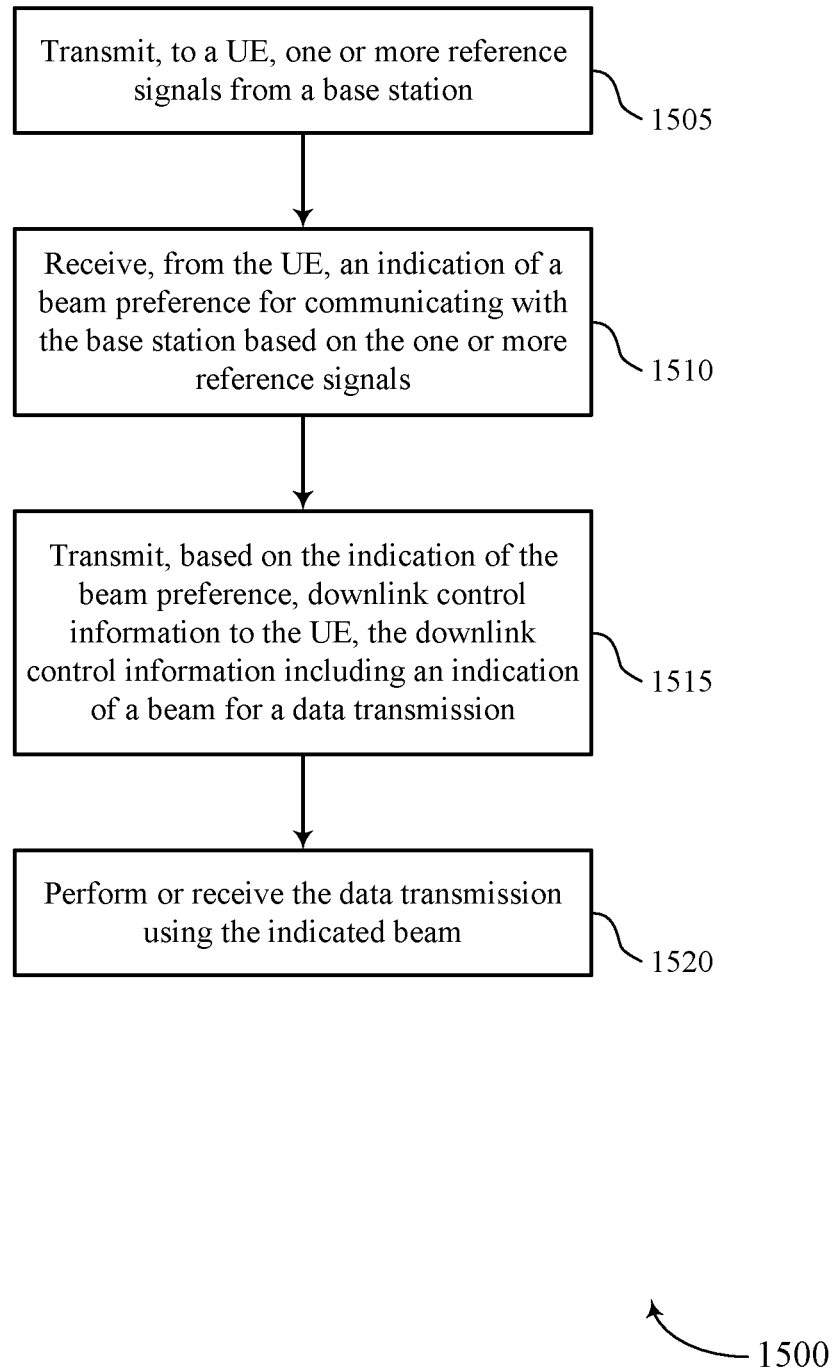

FIG. 15 shows a flowchart illustrating a method 1500 that supports beam preference feedback for data transmissions in accordance with aspects of the present disclosure. The operations of method 1500 may be implemented by a base station 105 or its components as described herein. For example, the operations of method 1500 may be performed by a communications manager as described with reference to FIGS. 9 through 12. In some examples, a base station may execute a set of instructions to control the functional elements of the base station to perform the functions described below. Additionally, or alternatively, a base station may perform aspects of the functions described below using special-purpose hardware.

At 1505, the base station may transmit, to a UE, one or more reference signals from a base station. The operations of 1505 may be performed according to the methods described herein. In some examples, aspects of the operations of 1505 may be performed by a reference signal manager as described with reference to FIGS. 9 through 12.

At 1510, the base station may receive, from the UE, an indication of a beam preference for communicating with the base station based on the one or more reference signals. The operations of 1510 may be performed according to the methods described herein. In some examples, aspects of the operations of 1510 may be performed by a beam preference manager as described with reference to FIGS. 9 through 12.

At 1515, the base station may transmit, based on the indication of the beam preference, DCI to the UE, the DCI including an indication of a beam for a data transmission. The operations of 1515 may be performed according to the methods described herein. In some examples, aspects of the operations of 1515 may be performed by a beam indication manager as described with reference to FIGS. 9 through 12.

At 1520, the base station may perform or receive the data transmission using the indicated beam. The operations of 1520 may be performed according to the methods described herein. In some examples, aspects of the operations of 1520 may be performed by a beam indication manager as described with reference to FIGS. 9 through 12.

Figure 16:
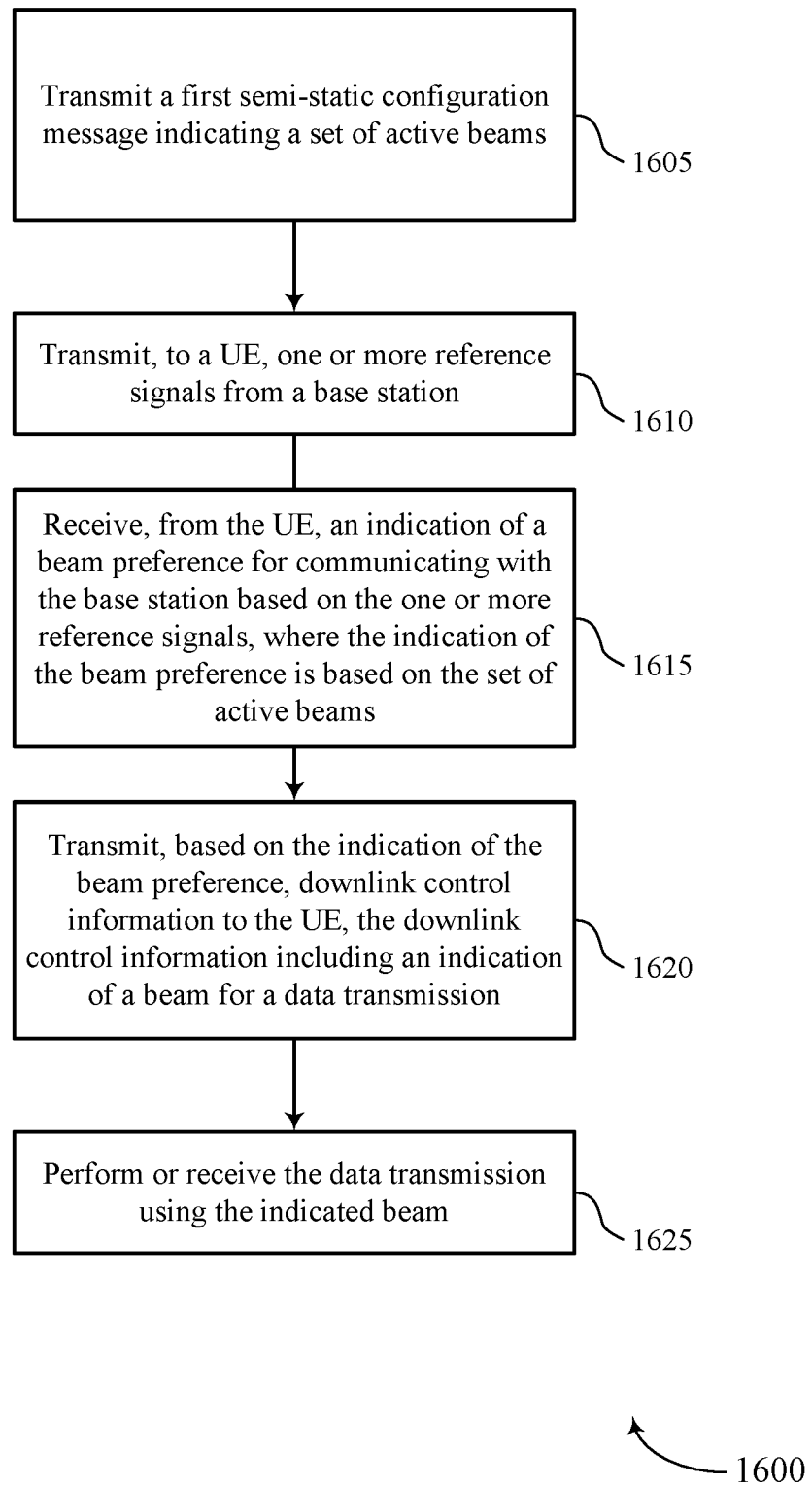

FIG. 16 shows a flowchart illustrating a method 1600 that supports beam preference feedback for data transmissions in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally, or alternatively, a base station may perform aspects of the functions described below using special-purpose hardware.

At 1605, the base station may transmit a first semi-static configuration message indicating a set of active beams. The operations of 1605 may be performed according to the methods described herein. In some examples, aspects of the operations of 1605 may be performed by a configuration message manager as described with reference to FIGS. 9 through 12.

At 1610, the base station may transmit, to a UE, one or more reference signals from a base station. The operations of 1610 may be performed according to the methods described herein. In some examples, aspects of the operations of 1610 may be performed by a reference signal manager as described with reference to FIGS. 9 through 12.

At 1615, the base station may receive, from the UE, an indication of a beam preference for communicating with the base station based on the one or more reference signals, where the indication of the beam preference is based on the set of active beams. The operations of 1615 may be performed according to the methods described herein. In some examples, aspects of the operations of 1615 may be performed by a beam preference manager as described with reference to FIGS. 9 through 12.

At 1620, the base station may transmit, based on the indication of the beam preference, DCI to the UE, the DCI including an indication of a beam for a data transmission. The operations of 1620 may be performed according to the methods described herein. In some examples, aspects of the operations of 1620 may be performed by a beam indication manager as described with reference to FIGS. 9 through 12.

At 1625, the base station may perform or receive the data transmission using the indicated beam. The operations of 1625 may be performed according to the methods described herein. In some examples, aspects of the operations of 1625 may be performed by a beam indication manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications at a user equipment (UE), comprising:
   a processor,
   memory coupled with the processor; and
   instructions stored in the memory and executable by the processor to cause the apparatus to:
      perform a measurement of one or more reference signals from a network device;
      transmit, to the network device, an indication of multiple beam preferences for communicating with the network device based at least in part on the measurement of the one or more reference signals, wherein the indication comprises a plurality of transmission configuration indication states, a plurality of spatial relations, or both, wherein the plurality of transmission configuration indication states, the plurality of spatial relations, or both indicate a set of one or more preferred beams and a set of one or more non-preferred beams;
      receive, based at least in part on the indication of the multiple beam preferences, downlink control information from the network device, the downlink control information indicating a beam for a data transmission; and
      communicate the data transmission using the indicated beam.

2. The apparatus of claim 1, wherein the instructions are further executable by the processor to cause the apparatus to:
   receive a first semi-static configuration message indicating a set of active beams; and
   identify the multiple beam preferences based at least in part on the set of active beams, wherein transmitting the indication of the multiple beam preferences is based at least in part on the identifying.

3. The apparatus of claim 2, wherein the instructions are further executable by the processor to cause the apparatus to:
   determine a mobility status of the UE; and
   determine the multiple beam preferences based at least in part on the mobility status.

4. The apparatus of claim 1, wherein the instructions are further executable by the processor to cause the apparatus to:
   receive, from the network device, an indication of an association between one or more beam preferences and one or more mobility statuses of the UE;
   determine a current mobility status of the UE;
   determine the current mobility status of the UE exceeds a mobility status associated with the indicated beam; and
   transmit, to the network device, an indication of a beam preference for communicating with the network device, the indication of the beam preference associated with the current mobility status of the UE.

5. An apparatus for wireless communications at a network device, comprising:
   a processor,
   memory coupled with the processor; and
   instructions stored in the memory and executable by the processor to cause the apparatus to:
      transmit one or more reference signals;
      receive an indication of multiple beam preferences for communicating with the network device based at least in part on the one or more reference signals, wherein the indication comprises a plurality of transmission configuration indication states, a plurality of spatial relations, or both, wherein the plurality of transmission configuration indication states, the plurality of spatial relations, or both indicate a set of one or more preferred beams and a set of one or more non-preferred beams;

transmit, based at least in part on the indication of the multiple beam preferences, downlink control information indicating a beam for a data transmission; and communicate the data transmission using the indicated beam.

6. A method for wireless communications at a user equipment (UE), comprising:

performing a measurement of one or more reference signals from a network device;

transmitting, to the network device, an indication of multiple beam preferences for communicating with the network device based at least in part on the measurement of the one or more reference signals, wherein the indication comprises a plurality of transmission configuration indication states, a plurality of spatial relations, or both, wherein the plurality of transmission configuration indication states, the plurality of spatial relations, or both indicate a set of one or more preferred beams and a set of one or more non-preferred beams;

receiving, based at least in part on the indication of the multiple beam preferences, downlink control information from the network device, the downlink control information indicating a beam for a data transmission; and communicating the data transmission using the indicated beam.

7. The method of claim 6, further comprising:
receiving a first semi-static configuration message indicating a set of active beams; and
identifying the multiple beam preferences based at least in part on the set of active beams, wherein transmitting the indication of the multiple beam preferences is based at least in part on the identifying.

8. The method of claim 7, wherein the indication of the multiple beam preferences comprises a subset of the set of active beams.

9. The method of claim 7, wherein the indication of the multiple beam preferences comprises one or more candidate beams not included within the set of active beams.

10. The method of claim 7, further comprising:
receiving, based at least in part on the indication of the multiple beam preferences, a second semi-static configuration message indicating an updated set of active beams from the network device, wherein the indication of the beam for the data transmission is based at least in part on the updated set of active beams.

11. The method of claim 7, wherein the indication of the multiple beam preferences comprises an indication of a candidate beam that is spatially wider than at least one active beam of the set of active beams.

12. The method of claim 6, further comprising:
generating a scheduling request message or a medium access control (MAC) control element (MAC-CE) message, wherein the indication of the multiple beam preferences is included in the generated scheduling request message or the generated MAC-CE message.

13. The method of claim 6, further comprising:
determining a mobility status of the UE; and
determining the multiple beam preferences based at least in part on the mobility status.

14. The method of claim 6, further comprising:
determining associations between one or more beam preferences and one or more mobility statuses of the UE based at least in part on the measurement of the one or more reference signals.

15. The method of claim 14, further comprising:
determining a current mobility status of the UE;
determining the current mobility status of the UE exceeds a mobility status associated with the indicated beam; and
transmitting, to the network device, an indication of a beam preference for communicating with the network device, the indication of the beam preference associated with the current mobility status of the UE.

16. A method for wireless communications at a network device, comprising:

transmitting one or more reference signals;

receiving an indication of multiple beam preferences for communicating with the network device based at least in part on the one or more reference signals, wherein the indication comprises a plurality of transmission configuration indication states, a plurality of spatial relations, or both, wherein the plurality of transmission configuration indication states, the plurality of spatial relations, or both indicate a set of one or more preferred beams and a set of one or more non-preferred beams;

transmitting, based at least in part on the indication of the multiple beam preferences, downlink control information indicating a beam for a data transmission; and communicating the data transmission using the indicated beam.

17. The method of claim 16, further comprising:
transmitting a first semi-static configuration message indicating a set of active beams, wherein the indication of the multiple beam preferences is based at least in part on the set of active beams.

18. The method of claim 17, wherein the indication of the multiple beam preferences comprises a subset of the set of active beams.

19. The method of claim 17, wherein the indication of the multiple beam preferences comprises one or more candidate beams not included within the set of active beams.

20. The method of claim 17, further comprising:
transmitting, based at least in part on the indication of the multiple beam preferences, a second semi-static configuration message indicating an updated set of active beams from the network device, wherein the indication of the beam for the data transmission is based at least in part on the updated set of active beams.

21. The method of claim 17, wherein the indication of the multiple beam preferences comprises an indication of a candidate beam that is spatially wider than at least one of the set of active beams.

22. The method of claim 16, further comprising:
receiving a scheduling request message or a medium access control (MAC) control element (MAC-CE) message, wherein the indication of the multiple beam preferences is included in the received scheduling request message or the received MAC-CE message.

23. The method of claim 16, wherein the indication of the multiple beam preferences comprises at least one of a preferred beam or a non-preferred beam.

24. The method of claim 16, further comprising:
associating one or more beam preferences with one or more mobility statuses of the UE based at least in part on the indication of the multiple beam preferences; and
transmitting an indication of the association between the one or more beam preferences and the one or more mobility statuses.

* * * * *